US012756298B2

(12) United States Patent
Sun et al.

(10) Patent No.: US 12,756,298 B2
(45) Date of Patent: Oct. 6, 2026

(54) POWER CONVERSION APPARATUS, CONTROL APPARATUS, AND SWITCH-MODE POWER SUPPLY

(71) Applicant: Huawei Digital Power Technologies Co., Ltd., Shenzhen (CN)

(72) Inventors: Kexin Sun, Xi'an (CN); Dongsheng Zhao, Xi'an (CN); Bo Li, Xi'an (CN); Yongpan Qiang, Xi'an (CN); Chuangpeng Li, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 149 days.

(21) Appl. No.: 18/929,829

(22) Filed: Oct. 29, 2024

(65) Prior Publication Data

US 2025/0055367 A1 Feb. 13, 2025

Related U.S. Application Data

(63) Continuation of application No. PCT/CN2022/104463, filed on Jul. 7, 2022.

(51) Int. Cl.

*H02M 1/42* (2007.01)
*H02M 1/00* (2006.01)
*H02M 1/36* (2007.01)
*H02M 7/219* (2006.01)

(52) U.S. Cl.

CPC ....... *H02M 1/4225* (2013.01); *H02M 1/0096* (2021.05); *H02M 1/36* (2013.01); *H02M 7/219* (2013.01)

(58) Field of Classification Search

CPC .......... H02M 1/12; H02M 1/32; H02M 1/322; H02M 3/3155; H02M 3/158; H02M 3/33507; H02M 3/33546; H02M 7/1557; H02M 7/1626; H02M 1/4208; H02M 7/53871; H02M 7/12; H02M 7/219; H02M 7/151; H02M 1/4233; H02M 5/4585; H02M 7/217; H02M 1/08; H02M 7/1552; H02M 7/1623; H02M 1/4225; H02M 3/33592; H02M 3/073; H02M 3/10; H02M 3/135; H02M 3/137; H02M 7/10; H02M 7/00; H02M 7/06; H02M 7/064; H02M 7/068; H02M 3/156; H02M 7/5387; H02M 1/083; H02M 1/14; H02M 1/4216; H02M 1/4266;

(Continued)

(56) References Cited

U.S. PATENT DOCUMENTS 5,572,417 A * 11/1996 Vinciarelli ............ H02M 7/217 323/222
6,504,497 B2 1/2003 Jang et al.

(Continued)

FOREIGN PATENT DOCUMENTS

CN 106230253 A 12/2016
CN 108649792 B 12/2020

*Primary Examiner* — Jeffrey A Gblende
(74) *Attorney, Agent, or Firm* — Maier & Maier, PLLC

(57) ABSTRACT

A power conversion apparatus, a control apparatus, and a switch-mode power supply, which may be used in the field of power supply technologies. A PPC inductor and a switch unit in a PPC circuit are reused in a hold-up time prolonging circuit, so that only at least one capacitor and at least one switch unit need to be added. Therefore, a quantity of newly added components is reduced, and costs are reduced.

20 Claims, 11 Drawing Sheets

(58) Field of Classification Search
CPC ..... G05F 1/30; G05F 1/33; G05F 1/32; G05F 1/34; G05F 1/38; G05F 1/52; H02J 7/12
See application file for complete search history.

(56) References Cited

U.S. PATENT DOCUMENTS

| | | | | |
|---|---|---|---|---|
| 7,729,143 | B2 * | 6/2010 | Lin ..................... | H02M 3/1584<br>363/65 |
| 8,134,849 | B2 * | 3/2012 | Chang ................. | H02M 1/4225<br>363/89 |
| 9,203,297 | B2 * | 12/2015 | Pan ..................... | H02M 1/4208 |
| 2003/0035311 | A1 | 2/2003 | Phadke | |
| 2017/0179813 | A1 | 6/2017 | Fu et al. | |
| 2019/0190370 | A1 | 6/2019 | Martin | |

* cited by examiner

POWER CONVERSION APPARATUS, CONTROL APPARATUS, AND SWITCH-MODE POWER SUPPLY

CROSS-REFERENCE TO RELATED APPLICATIONS

This application is a continuation of International Application No. PCT/CN2022/104463, filed on Jul. 7, 2022, the disclosure of which is hereby incorporated by reference in its entirety.

TECHNICAL FIELD

The embodiments relate to the field of power supply technologies, and to a power conversion apparatus, a control apparatus, and a switch-mode power supply.

BACKGROUND

In the power supply application field, a power supply conversion device including an alternating current to direct current (AC-DC) converter can be used to supply power to a power-consuming device. This type of power supply conversion device may be referred to as an AC-DC power supply device.

FIG. 1 is a schematic circuit topology diagram of the AC-DC converter. As shown in FIG. 1, the AC-DC converter may include a rectifier circuit, a bus capacitor C1, a direct current converter, and an output capacitor C0. The rectifier circuit is configured to: convert an alternating current into a first direct current, and output the first direct current. The bus capacitor C1 is configured to: filter the first direct current to obtain a stable second direct current, and output the second direct current. The direct current converter is configured to: convert the second direct current into a third direct current corresponding to a voltage required by the power-consuming device, and output the third direct current. The output capacitor C0 is configured to: perform voltage regulation on the third direct current, to obtain a stable fourth direct current, and output the fourth direct current to the power-consuming device.

When the power supply conversion device including the AC-DC converter is used to supply power to the power-consuming device, the bus capacitor C1 may continue to supply power to the direct current converter in a period of time after the AC-DC converter is directly disconnected from an alternating current power supply, that is, in a period of time after a power failure commonly known in this field. In this way, the output capacitor may output electric energy to the power-consuming device, so that the power-consuming device may save or transmit necessary data. This facilitates reliable shutdown of the device. In this field, the period of time is referred to as hold-up time.

Generally, a longer hold-up time of the AC-DC converter is better. Therefore, how to increase the hold-up time of the AC-DC converter becomes an urgent problem to be resolved.

SUMMARY

The embodiments provide a power conversion apparatus, a control apparatus, and a switch-mode power supply. In the power conversion apparatus and a power supply conversion device provided in the embodiments, an electronic component in a PFC circuit is reused in a hold-up time prolong circuit. Therefore, hold-up time of the power conversion apparatus and the power supply conversion device may be prolonged while reducing costs and a circuit volume.

According to a first aspect, the embodiments provide a power conversion apparatus. The apparatus includes a rectifier circuit, a power factor correction (PFC) circuit, and a bus capacitor that are sequentially connected. The rectifier circuit is configured to convert a received alternating current into a first direct current. The PFC circuit is configured to compensate a phase between a current and a voltage of the received first direct current to obtain a second direct current. The bus capacitor is configured to filter the second direct current to obtain a third direct current.

In addition, a first inductor in the PFC circuit and the bus capacitor are configured to form a first current loop. In the first current loop, the bus capacitor supplies electric energy to the first inductor, and the first inductor stores electric energy released by the bus capacitor.

The apparatus further includes an auxiliary capacitor. The auxiliary capacitor, the bus capacitor, and the first inductor are configured to form a second current loop. The bus capacitor and the first inductor are connected in series in the second current loop, to supply electric energy to the auxiliary capacitor, and the auxiliary capacitor stores electric energy released by the bus capacitor and the first inductor. The auxiliary capacitor is further configured to supply electric energy to a subsequent circuit.

In this apparatus, the bus capacitor and the first inductor in the PFC circuit are configured to form the first current loop, so that the bus capacitor may supply electric energy to the first inductor, and the first inductor may store electric energy released by the bus capacitor. Then, the auxiliary capacitor, the bus capacitor, and the first inductor are configured to form the second current loop, so that the first inductor and the bus capacitor may supply electric energy to the auxiliary capacitor, and the auxiliary capacitor may store electric energy released by the first inductor and the bus capacitor.

In addition, the first inductor and the bus capacitor are connected in series, and a voltage at which the first inductor and the bus capacitor charge the auxiliary capacitor is a sum of a voltage of the first inductor and a voltage of the bus capacitor, that is, a charging voltage of the auxiliary capacitor is increased. Therefore, a charge storage amount of the auxiliary capacitor is increased, and time in which the auxiliary capacitor supplies power to the subsequent circuit may be further prolonged.

In the apparatus, the first inductor in the PFC circuit is shared, to assist the bus capacitor to step up a voltage for the auxiliary capacitor, so that the auxiliary capacitor may prolong time of supplying power to the subsequent circuit during a power failure. Therefore, a quantity of electronic components that need to be added to prolong the hold-up time may be reduced, a board area occupied by the electronic components may be reduced, and costs may be reduced. In addition, this may further avoid a problem of a decrease in power supply efficiency of a power supply caused by adding a newly added power component in an existing circuit for prolonging the hold-up time.

In some possible implementations, the first inductor, the bus capacitor, and the auxiliary capacitor are connected through a switch circuit, and the switch circuit is configured to: after a power failure occurs in the rectifier circuit, conduct the first current loop or the second current loop.

The power failure of the rectifier circuit means that the rectifier circuit has no current input. For example, when the rectifier circuit is disconnected from a power supply, or when the power supply stops providing electric energy, the power failure occurs in the rectifier circuit.

Optionally, the switch circuit may conduct the first current loop or the second current loop.

In some possible implementations, the switch circuit includes a first switch unit, a second switch unit, a third switch unit, and a fourth switch unit.

A first port of the first inductor is connected to a positive electrode of the bus capacitor through the first switch unit, the first port of the first inductor is connected to a negative electrode of the bus capacitor through the second switch unit, the positive electrode of the bus capacitor is connected to a positive electrode of the auxiliary capacitor, and a negative electrode of the auxiliary capacitor is connected to the first port of the first inductor through the second switch unit.

A second port of the first inductor is connected to the negative electrode of the bus capacitor through the third switch unit, and the negative electrode of the auxiliary capacitor is connected to the negative electrode of the bus capacitor through the fourth switch unit.

In some possible implementations, the PFC circuit includes the first switch unit and the second switch unit.

In this implementation, the switch unit in the PFC circuit is reused to connect the first inductor, the bus capacitor, and the auxiliary capacitor. Therefore, a quantity of electronic components that need to be added to prolong the hold-up time may be further reduced, a board area occupied by the electronic components may be reduced, and costs may be reduced.

In some possible implementations, the third switch unit includes a MOS transistor and a diode, a negative electrode of the diode is connected to the negative electrode of the bus capacitor, a positive electrode of the diode is connected to a source of the MOS transistor, and a drain of the MOS transistor is connected to the second port of the first inductor.

In this implementation, because the diode can be turned on or off by the diode without being controlled, control complexity of the apparatus may be reduced, and complexity of the control apparatus may be further reduced.

In some possible implementations, the switch circuit includes a first switch unit, a second switch unit, a third switch unit, and a fourth switch unit.

A first port of the first inductor is connected to a positive electrode of the bus capacitor through the first switch unit, the first port of the first inductor is connected to a negative electrode of the bus capacitor through the second switch unit, a positive electrode of the auxiliary capacitor is connected to the first port of the first inductor through the first switch unit, and the negative electrode of the bus capacitor is connected to a negative electrode of the auxiliary capacitor.

A second port of the first inductor is connected to the positive electrode of the bus capacitor through the third switch unit, and the positive electrode of the auxiliary capacitor is connected to the positive electrode of the bus capacitor through the fourth switch unit.

In some possible implementations, the PFC circuit further includes a first switch unit and a second switch unit.

In this implementation, the switch unit in the PFC circuit is reused to connect the first inductor, the bus capacitor, and the auxiliary capacitor. Therefore, a quantity of electronic components that need to be added to prolong the hold-up time may be further reduced, a board area occupied by the electronic components may be reduced, and costs may be reduced.

In some possible implementations, the third switch unit includes a MOS transistor and a diode, a positive electrode of the diode is connected to the positive electrode of the bus capacitor, a negative electrode of the diode is connected to a drain of the MOS transistor, and a source of the MOS transistor is connected to the second port of the first inductor.

In this implementation, because the diode can be turned on or off by the diode without being controlled, control complexity of the apparatus may be reduced, and complexity of the control apparatus may be further reduced.

In some possible implementations, the first switch unit includes a diode, and a positive electrode of the diode in the first switch unit is connected to the first port of the first inductor.

In this implementation, because the diode can be turned on or off by the diode without being controlled, control complexity of the apparatus may be reduced, and complexity of the control apparatus may be further reduced.

In some possible implementations, the first switch unit includes a field effect MOS transistor, a gallium nitride (GaN) transistor, a silicon carbide (SiC) transistor, or an insulated gate bipolar transistor (IGBT).

Optionally, the first switch unit includes a first MOS transistor and a second MOS transistor, the first MOS transistor and the second MOS transistor are connected in series, and a source of the first MOS transistor is connected to a source of the second MOS transistor, or a drain of the first MOS transistor is connected to a drain of the second MOS transistor.

In some possible implementations, the fourth switch unit includes a field effect MOS transistor, a GaN transistor, a SiC transistor, or an IGBT.

In some possible implementations, the second switch unit includes a field effect MOS transistor, a GaN transistor, a SiC transistor, or an IGBT.

In some possible implementations, the apparatus further includes a soft-start circuit, the soft-start circuit includes the fourth switch unit, and the soft-start circuit is configured to control a rising slope and an amplitude of an input current of the bus capacitor.

In this implementation, the switch unit in the soft-start circuit is shared to step up a voltage for the auxiliary capacitor. Therefore, a quantity of components may be further reduced, costs may be reduced, and a board area occupied by the components may be reduced.

In some possible implementations, the soft-start circuit further includes a resistance unit, and the resistance unit and the fourth switch unit are connected in parallel.

In some possible implementations, the rectifier circuit includes a first diode, a second diode, a third diode, and a fourth diode. A positive electrode of the first diode and a negative electrode of the third diode are connected to a first port of the rectifier circuit. The first port of the rectifier circuit is configured to connect to one electrode of an alternating current power supply. A positive electrode of the second diode and a negative electrode of the fourth diode are connected to a second port of the rectifier current. The second port of the rectifier circuit is configured to connect to the other electrode of the alternating current power supply. A negative electrode of the first diode and a negative electrode of the second diode are connected to a third port of the rectifier circuit. A positive electrode of the third diode and a positive electrode of the fourth diode are connected to a fourth port of the rectifier current. The third port of the rectifier circuit is connected to a first port of the PFC circuit. A fourth port of the rectifier circuit is connected to a second port of the PFC circuit.

The first port of the PFC circuit is a port that is in the PFC circuit and that is connected to the first inductor, and the second port of the PFC circuit is a port that is in the PFC circuit and that is connected to the second switch unit.

The PFC circuit in this implementation may be referred to as a bridged PFC circuit. That is, in the solutions of the embodiments, a small quantity of components may be used in the apparatus including the bridged PFC circuit to prolong the hold-up time.

In some possible implementations, the rectifier circuit includes a first diode and a second diode, a positive electrode of the first diode and a negative electrode of the second diode are connected to a first port of the rectifier circuit, a negative electrode of the first diode is connected to a second port of the rectifier circuit, and a positive electrode of the second diode is connected to a third port of the rectifier circuit.

The first port of the rectifier circuit is configured to connect to a negative electrode of an alternating current power supply, a first port of the PFC circuit is configured to connect to a positive electrode of the alternating current power supply, the second port of the rectifier circuit is connected to a second port of the PFC circuit, and the third port of the rectifier circuit is connected to a third port of the PFC circuit.

The first port of the PFC circuit is a port that is in the PFC circuit and that is connected to the first inductor, the second port of the PFC circuit is a port that is in the PFC circuit and that is connected to the first switch unit, and the third port of the PFC circuit is a port that is in the PFC circuit and that is connected to the second switch unit.

The PFC circuit in this implementation may be referred to as a bridgeless PFC circuit. That is, in the solutions of the embodiments, a small quantity of components may be used in the apparatus including the bridgeless PFC circuit to prolong the hold-up time.

In some possible implementations, the rectifier circuit includes a first diode and a second diode, a negative electrode of the first diode is connected to a first port of the rectifier circuit, a negative electrode of the second diode is connected to a second port of the rectifier circuit, and a positive electrode of the first diode and a positive electrode of the second diode are connected to a third port of the rectifier circuit.

The PFC circuit further includes a second inductor, a fifth switch unit, and a sixth switch unit. A first port of the second inductor is connected to a fourth port of the PFC circuit. A second port of the second inductor, a first port of the fifth switch unit, and a first port of the sixth switch unit are connected. A second port of the fifth switch unit is connected to a second port of the PFC circuit. A second port of the sixth switch unit is connected to a third port of the PFC circuit.

The first port of the rectifier circuit and a first port of the PFC circuit are configured to connect to a positive electrode of an alternating current power supply, the second port of the rectifier circuit and the fourth port of the PFC circuit are configured to connect to a negative electrode of the alternating current power supply, and the third port of the rectifier circuit is connected to the third port of the PFC circuit.

The first port of the PFC circuit is a port that is in the PFC circuit and that is connected to the first inductor, the second port of the PFC circuit is a port that is in the PFC circuit and that is connected to the first switch unit, and the third port of the PFC circuit is a port that is in the PFC circuit and that is connected to the second switch unit.

The PFC circuit in this implementation may be referred to as a dual-boost bridgeless PFC circuit. That is, in the solutions of the embodiments, a small quantity of components may be used in the apparatus including the dual-boost bridgeless PFC circuit to prolong the hold-up time.

According to a second aspect, the embodiments provide a control method for a power conversion apparatus. The power conversion apparatus may be the power conversion apparatus in any possible implementation of the first aspect. For example, the power conversion apparatus includes a rectifier circuit, a PFC circuit, a bus capacitor, and an auxiliary capacitor. The rectifier current, the PFC circuit, the bus capacitor, and the auxiliary capacitor are sequentially connected. The rectifier circuit is configured to convert a received alternating current into a first direct current. The PFC circuit is configured to compensate a phase between a current and a voltage of the received first direct current to obtain a second direct current. The bus capacitor is configured to filter the second direct current to obtain a third direct current. The auxiliary capacitor is configured to supply electric energy to a subsequent circuit.

The method includes: when an input power failure occurs in the rectifier circuit, controlling the power conversion apparatus to be in a first working state or a second working state.

The first working state includes: the bus capacitor and the first inductor form a first current loop; and in the first current loop, the bus capacitor supplies electric energy to the first inductor, and the first inductor stores electric energy released by the bus capacitor.

The second working state includes: the auxiliary capacitor, the bus capacitor, and the first inductor form a second current loop; and in the second current loop, the bus capacitor and the first inductor are connected in series to supply electric energy to the auxiliary capacitor, and the auxiliary capacitor stores electric energy released by the bus capacitor and the first inductor.

In this embodiment, in the first working state, a loop may be formed between the first inductor and the bus capacitor, so that the bus capacitor charges the first inductor; and in the second working state, a loop may be formed between the first inductor, the bus capacitor, and the auxiliary capacitor, so that the bus capacitor and the first capacitor jointly charge the auxiliary capacitor. Therefore, a voltage of the auxiliary capacitor may be increased, the auxiliary capacitor may store more electricity, and time in which the auxiliary capacitor supplies power to the subsequent circuit may be prolonged.

In this embodiment, the power conversion apparatus may be controlled to be in the first working state or the second working state.

In some possible implementations, the first inductor, the bus capacitor, and the auxiliary capacitor are connected through a switch circuit. The controlling the power conversion apparatus to be in a first working state or a second working state includes: controlling a first part of the switch circuit or a second part of the switch circuit to be connected, where the first part of the switch circuit is configured to connect the bus capacitor and the first inductor, and the second part of the switch circuit is configured to connect the bus capacitor, the first inductor, and the auxiliary capacitor.

Optionally, the first part of the switch circuit and the second part of the switch circuit may be controlled to be alternately connected.

In this implementation, that the first part of the circuit and the second part of the circuit are alternately turned on may be understood as: the first part of the circuit is turned on and the second part of the circuit is turned off, the second part of the circuit is turned on and the first part of the circuit is turned off, and then the first part of the circuit is turned on and the second part of the circuit is turned off. The rest may be deduced by analogy.

In some possible implementations, the switch circuit includes a first switch unit, a second switch unit, a third switch unit, and a fourth switch unit. A first port of the first inductor is connected to a positive electrode of the bus capacitor through the first switch unit, the first port of the first inductor is connected to a negative electrode of the bus capacitor through the second switch unit, the positive electrode of the bus capacitor is connected to a positive electrode of the auxiliary capacitor, and a negative electrode of the auxiliary capacitor is connected to the first port of the first inductor through the second switch unit. A second port of the first inductor is connected to the negative electrode of the bus capacitor through the third switch unit, and the negative electrode of the auxiliary capacitor is connected to the negative electrode of the bus capacitor through the fourth switch unit.

The controlling the power conversion apparatus to be in a first working state includes: controlling the first switch unit and the third switch unit to be turned on, and controlling the second switch unit and the fourth switch unit to be turned off, so that the power conversion apparatus is in the first working state. The controlling the power conversion apparatus to be in a second working state includes: controlling the second switch unit and the third switch unit to be turned on, and controlling the first switch unit and the fourth switch unit to be turned off, so that the power conversion apparatus is in the second working state.

In this implementation, the switch unit in the PFC circuit is reused to control the power conversion apparatus to be in the first working state or the second working state. Therefore, electronic components that need to be added to prolong the hold-up time may be further reduced, a board area occupied by the electronic components may be reduced, and costs may be reduced.

In some possible implementations, the switch circuit includes a first switch unit, a second switch unit, a third switch unit, and a fourth switch unit. A first port of the first inductor is connected to a positive electrode of the bus capacitor through the first switch unit, the first port of the first inductor is connected to a negative electrode of the bus capacitor through the second switch unit, a positive electrode of the auxiliary capacitor is connected to the first port of the first inductor through the first switch unit, and the negative electrode of the bus capacitor is connected to a negative electrode of the auxiliary capacitor. The apparatus includes a third switch unit and a fourth switch unit. A second port of the first inductor is connected to the positive electrode of the bus capacitor through the third switch unit, and the positive electrode of the auxiliary capacitor is connected to the positive electrode of the bus capacitor through the fourth switch unit.

The controlling the power conversion apparatus to be in a first working state includes: controlling the second switch unit and the third switch unit to be turned on, and controlling the first switch unit and the fourth switch unit to be turned off, so that the power conversion apparatus is in the first working state. The controlling the power conversion apparatus to be in a second working state includes: controlling the first switch unit and the third switch unit to be turned on, and controlling the second switch unit and the fourth switch unit to be turned off, so that the power conversion apparatus is in the second working state.

In some possible implementations, the PFC circuit further includes a first switch unit and a second switch unit.

In this implementation, the switch unit in the PFC circuit is reused to control the power conversion apparatus to be in the first working state or the second working state. Therefore, electronic components that need to be added to prolong the hold-up time may be further reduced, a board area occupied by the electronic components may be reduced, and costs may be reduced.

According to a third aspect, the embodiments provide a control apparatus for a power conversion apparatus. The power conversion apparatus may be the power conversion apparatus in any possible implementation of the first aspect, and the control apparatus is a corresponding control apparatus in the second aspect.

For example, the power conversion apparatus includes a rectifier circuit, a PFC circuit, a bus capacitor, and an auxiliary capacitor. The rectifier current, the PFC circuit, the bus capacitor, and the auxiliary capacitor are sequentially connected. The rectifier circuit is configured to convert a received alternating current into a first direct current. The PFC circuit is configured to compensate a phase between a current and a voltage of the received first direct current to obtain a second direct current. The bus capacitor is configured to filter the second direct current to obtain a third direct current. The auxiliary capacitor is configured to supply electric energy to a subsequent circuit.

The control apparatus is configured to: when an input power failure occurs in the rectifier circuit, control the power conversion apparatus to be in a first working state or a second working state.

The first working state includes: The bus capacitor and the first inductor form a first current loop; and in the first current loop, the bus capacitor supplies electric energy to the first inductor, and the first inductor stores electric energy released by the bus capacitor.

The second working state includes: The auxiliary capacitor, the bus capacitor, and the first inductor form a second current loop; and in the second current loop, the bus capacitor and the first inductor are connected in series to supply electric energy to the auxiliary capacitor, and the auxiliary capacitor stores electric energy released by the bus capacitor and the first inductor.

Optionally, the control apparatus may be configured to control the power conversion apparatus to be in the first working state or the second working state.

In some possible implementations, the PFC circuit includes a first switch unit and a second switch unit. A first port of the first inductor is connected to a positive electrode of the bus capacitor through the first switch unit, the first port of the first inductor is connected to a negative electrode of the bus capacitor through the second switch unit, the positive electrode of the bus capacitor is connected to a positive electrode of the auxiliary capacitor, and a negative electrode of the auxiliary capacitor is connected to the first port of the first inductor through the second switch unit. The apparatus further includes a third switch unit and a fourth switch unit. A second port of the first inductor is connected to the negative electrode of the bus capacitor through the third switch unit, and the negative electrode of the auxiliary capacitor is connected to the negative electrode of the bus capacitor through the fourth switch unit.

When controlling the power conversion apparatus to be in the first working state, the control apparatus can be configured to: control the first switch unit and the third switch unit to be turned on, and control the second switch unit and the fourth switch unit to be turned off, so that the power conversion apparatus is in the first working state. When controlling the power conversion apparatus to be in the second working state, the control apparatus can be configured to: control the second switch unit and the third switch unit to be turned on, and control the first switch unit and the fourth switch unit to be turned off, so that the power conversion apparatus is in the second working state.

In some possible implementations, the PFC circuit further includes a first switch unit and a second switch unit. A first port of the first inductor is connected to a positive electrode of the bus capacitor through the first switch unit, the first port of the first inductor is connected to a negative electrode of the bus capacitor through the second switch unit, a positive electrode of the auxiliary capacitor is connected to the first port of the first inductor through the first switch unit, and the negative electrode of the bus capacitor is connected to a negative electrode of the auxiliary capacitor. The apparatus includes a third switch unit and a fourth switch unit. A second port of the first inductor is connected to the positive electrode of the bus capacitor through the third switch unit, and the positive electrode of the auxiliary capacitor is connected to the positive electrode of the bus capacitor through the fourth switch unit.

When controlling the power conversion apparatus to be in the first working state, the control apparatus can be configured to: control the second switch unit and the third switch unit to be turned on, and control the first switch unit and the fourth switch unit to be turned off, so that the power conversion apparatus is in the first working state. When controlling the power conversion apparatus to be in the second working state, the control apparatus can be configured to: control the first switch unit and the third switch unit to be turned on, and control the second switch unit and the fourth switch unit to be turned off, so that the power conversion apparatus is in the second working state.

For effects of the control apparatus in this embodiment, refer to the control method in the second aspect. Details are not described herein again.

According to a fourth aspect, the embodiments provide a switch-mode power supply. The switch-mode power supply includes the power conversion apparatus in any possible implementation of the first aspect and the control apparatus in any possible implementation of the third aspect.

For effects of the switch-mode power supply in this embodiment, refer to content in the first aspect and the second aspect. Details are not described herein again.

BRIEF DESCRIPTION OF DRAWINGS

The accompanying drawings show aspects of embodiments, and are used together with the descriptions to explain a principle of this embodiments.

FIG. 5(*b*) is a schematic diagram of another current direction when a power conversion apparatus supplies power normally;

FIG. 6(*b*) is a schematic diagram of another current direction when a power failure occurs in a power conversion apparatus;

FIG. 7(*b*) is an example diagram of a structure of a switch unit according to another embodiment;

FIG. 10(*b*) is a schematic diagram of a structure of a rectifier circuit according to another embodiment;

FIG. 10(*c*) is a schematic diagram of a structure of a rectifier circuit according to still another embodiment;

FIG. 12(*b*) is a schematic diagram of another current direction when a power failure occurs in a power conversion apparatus;

The foregoing accompanying drawings show specific embodiments, and more detailed descriptions are provided below. The accompanying drawings and text descriptions are not intended to limit the scope of the embodiments in any manner.

DETAILED DESCRIPTION OF EMBODIMENTS

To understand the objectives, solutions, and advantages of the embodiments more clearly, the following further describes the embodiments with reference to the accompanying drawings. It is clear that the described embodiments are some, but not all, of the embodiments. All other embodiments obtained based on embodiments fall within their scope.

An AC-DC converter can be used in a power adapter, and the power adapter is commonly referred to as a charger. For example, a power supply conversion device including the AC-DC converter may be used as a power supply for a server or a network device such as a server and a router switch, and may be used as a communication power supply, an uninterruptible power supply (UPS), and a light-emitting diode (LED) lighting power supply, to supply power to various electronic devices such as a display, a server, and a network device.

When the power supply conversion device including the AC-DC converter is suddenly powered off when supplying power to a power-consuming device, a bus capacitor in the AC-DC converter may continue to supply energy to a direct current converter within hold-up time. In this way, an output capacitor may output electric energy to the power-consuming device, so that the power-consuming device may save or transmit necessary data. This facilitates reliable shutdown of the device. Generally, longer hold-up time of the AC-DC converter is better.

Figure 1:
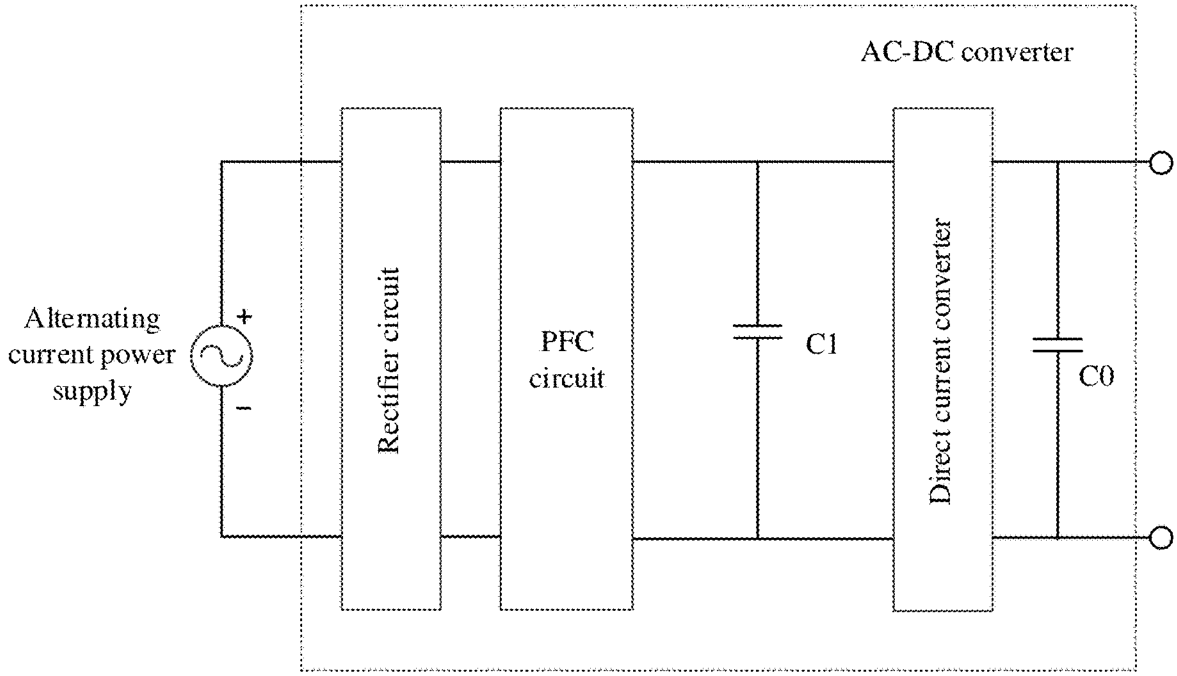
FIG. 1 is a schematic circuit topology diagram of an AC-DC converter.
Figure 2:
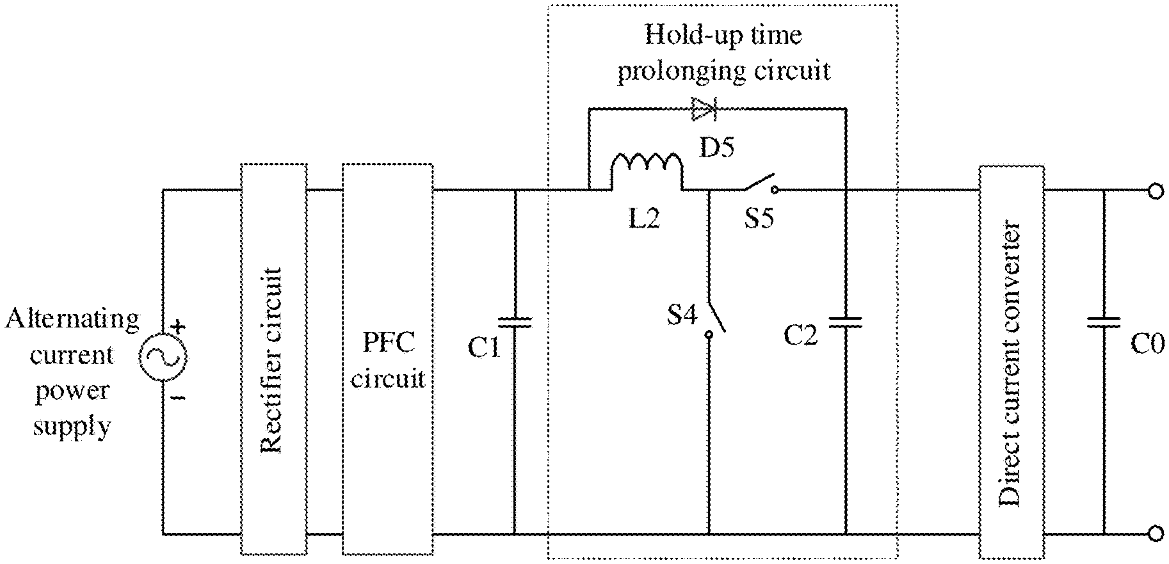
FIG. 2 is a schematic diagram of a structure of an AC-DC circuit.

FIG. 2 is a schematic diagram of a structure of an AC-DC circuit. As shown in FIG. 2, in a circuit structure, a hold-up time prolonging circuit is additionally added between a bus capacitor C1 and a direct current converter of an original AC-DC converter. The hold-up time prolonging circuit may include inductors L2, S4, and S5, an auxiliary capacitor C2, and a power component D5, and the power component D5 may be a diode or a MOS transistor.

When the power supply conversion device of the AC-DC converter supplies power normally, S4 and S5 in the hold-up time prolonging circuit are controlled to be turned off. In this case, the power component D5 uses the hold-up time prolonging circuit as a bypass. When a power failure occurs in the power supply conversion device of the AC-DC converter, S4 is controlled to be turned on and S5 is controlled to be turned off, the bus capacitor C1 transfers energy to the inductor L2, and S4 is controlled to be turned off and S5 is controlled to be turned on. In this case, the inductor L2 and the bus capacitor C1 supply energy to the auxiliary capacitor C2, so that a voltage of the auxiliary capacitor C2 may be stabilized within a rated input voltage range of the direct current converter, to prolong hold-up time.

However, in the circuit structure, the newly added hold-up time prolonging circuit includes five components, and due to a large quantity of newly added components, the newly added hold-up time prolonging circuit occupies a large board area, and costs are high.

Therefore, the embodiments provide a new solution, to resolve a problem of an excessively large quantity of newly added components in an existing circuit structure while prolonging the hold-up time of the AC-DC converter.

It should be noted that in embodiments, two units are directly connected or indirectly connected by using another unit.

Figure 3:
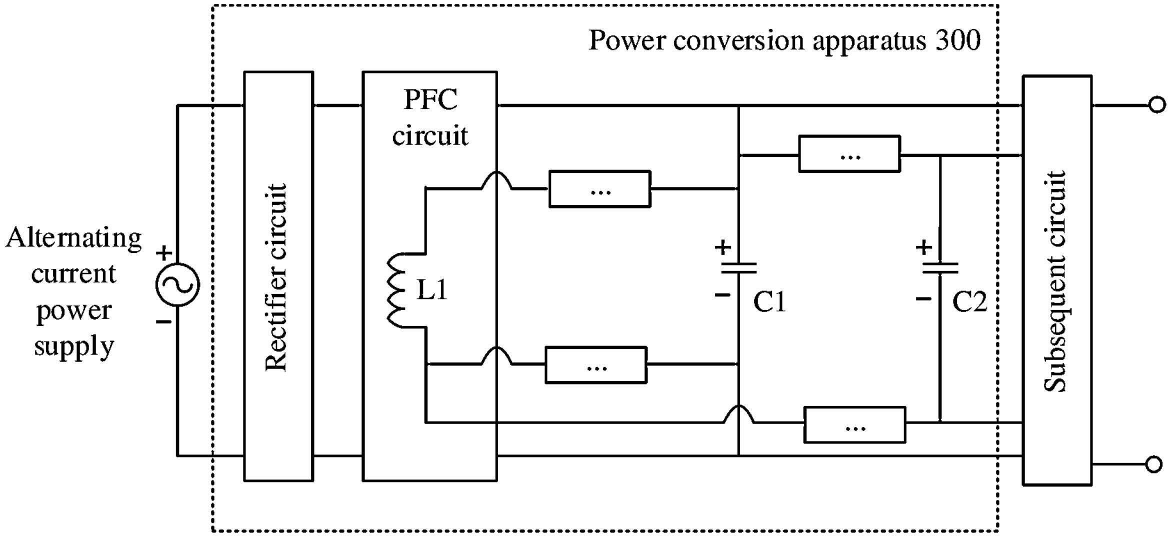
FIG. 3 is an example diagram of a structure of a power conversion apparatus according to an embodiment.

FIG. 3 is an example diagram of a structure of a power conversion apparatus 300 according to an embodiment. As shown in FIG. 3, the power conversion apparatus 300 may include a rectifier circuit, a power factor correction (PFC) circuit, a bus capacitor C1, an auxiliary capacitor C2, and a subsequent circuit, and the PFC circuit includes a first inductor L1.

It may be understood that the structure is merely an example, and the power conversion apparatus in this embodiment may include more or fewer circuit units. For example, the power conversion apparatus may not include the rectifier circuit and/or the subsequent circuit.

In this embodiment, the rectifier circuit, the PFC circuit, and the bus capacitor are sequentially connected. In this embodiment, the rectifier circuit may be configured to: receive an alternating current, convert the alternating current into a first direct current, and output the first direct current.

In this embodiment, the PFC circuit may be configured to: receive the first direct current output by the rectifier circuit, compensate a phase between a current and a voltage of the first direct current, and output a compensated second direct current.

The bus capacitor is configured to: receive the second direct current, filter the second direct current, and output the filtered third direct current to the subsequent circuit.

The subsequent circuit in this embodiment may include a direct current conversion circuit, and the direct current conversion circuit may be configured to perform processing such as voltage step-down or step-up on a received direct current signal.

Optionally, the subsequent circuit may include an output capacitor, and the output capacitor may be configured to perform voltage regulation on a received electrical signal. Optionally, the subsequent circuit may include a direct current conversion circuit and an output capacitor.

In this embodiment, L1 and C1 may be connected in series to form a first current loop. When the first current loop is formed between C1 and L1, C1 supplies electric energy to L1, and L1 serves as an energy storage component to store electric energy released by C1.

In this embodiment, L1, C1, and C2 are configured to form a second current loop. When the second current loop is formed between C2, C1, and L1, C1 and L1 are connected in series to supply electric energy to C2, and C2 serves as an energy storage component to store electric energy released by C1 and L1.

In some implementations of this embodiment, L1, C1, and C2 are connected through a switch circuit, and the switch circuit is configured to: after a power failure occurs in the rectifier circuit, conduct the first current loop or the second current loop.

For example, the switch circuit may be divided into two parts. One part is referred to as a first part of the switch circuit, and the other part is referred to as a second part of the switch circuit. The first part of the switch circuit includes a switch circuit between C1 and L1, and the second part of the switch circuit includes switch circuits between C2, C1, and L1.

It may be understood that the first part of the switch circuit and the second part of the switch circuit are divided based on functions. Optionally, the first part of the switch circuit and the second part of the circuit may include a common electronic component, and the common electronic component is configured to be divided into different parts of the switch circuit when different current loops are connected.

In some possible implementations, the switch circuit may include a first switch unit, a second switch unit, a third switch unit, and a fourth switch unit.

When the switch circuit includes the first switch unit, the second switch unit, the third switch unit, and the fourth switch unit, in an example, a first port of the first inductor is connected to a positive electrode of the bus capacitor through the first switch unit, the first port of the first inductor is connected to a negative electrode of the bus capacitor through the second switch unit, the positive electrode of the bus capacitor is connected to a positive electrode of the auxiliary capacitor, and a negative electrode of the auxiliary capacitor is connected to the first port of the first inductor through the second switch unit. In addition, a second port of the first inductor is connected to the negative electrode of the bus capacitor through the third switch unit, and the negative electrode of the auxiliary capacitor is connected to the negative electrode of the bus capacitor through the fourth switch unit.

When the switch circuit includes the first switch unit, the second switch unit, the third switch unit, and the fourth switch unit, in another example, a first port of the first inductor is connected to a positive electrode of the bus capacitor through the first switch unit, the first port of the first inductor is connected to a negative electrode of the bus capacitor through the second switch unit, a positive electrode of the auxiliary capacitor is connected to the first port of the first inductor through the first switch unit, and the negative electrode of the bus capacitor is connected to a negative electrode of the auxiliary capacitor. In addition, a second port of the first inductor is connected to the positive electrode of the bus capacitor through the third switch unit, and the positive electrode of the auxiliary capacitor is connected to the positive electrode of the bus capacitor through the fourth switch unit.

In some implementations, the first switch unit and/or the second switch unit may be a switch unit in the PFC circuit. The following describes some examples of the power conversion apparatus in the embodiments by using an example in which both the first switch unit and the second switch unit are switch units in the PFC circuit.

Figure 4:
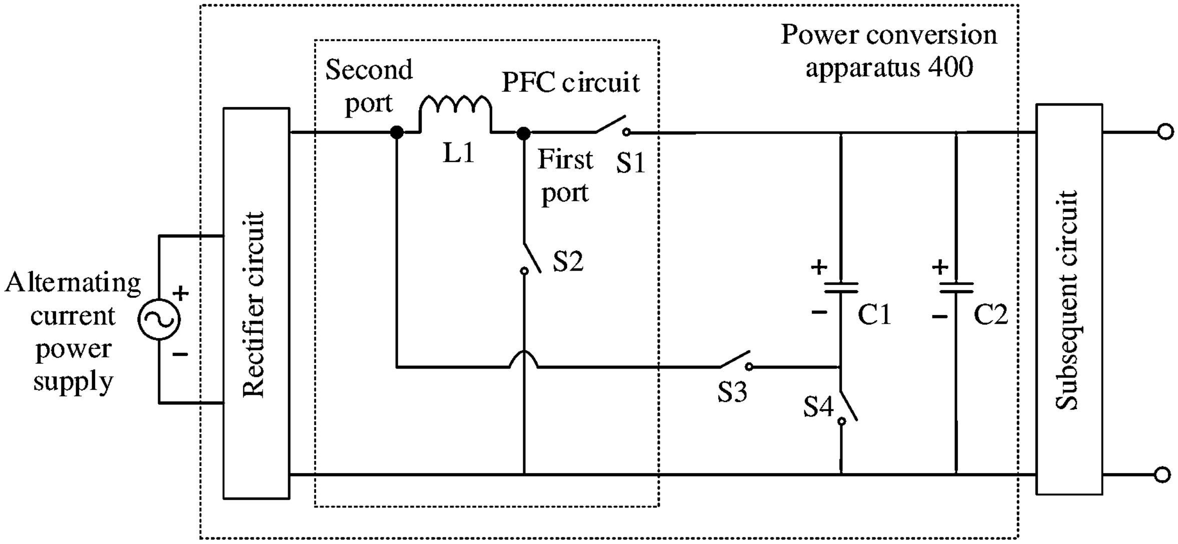
FIG. 4 is a detailed schematic diagram of a structure of a power conversion apparatus 400 according to an embodiment.

FIG. 4 is an example diagram of a structure of a power conversion apparatus 400 according to an embodiment. As shown in FIG. 4, the PFC circuit includes a first switch unit S1 and a second switch unit S2.

S1 is connected to a first port of L1 and a positive electrode of C1, a first end of S2 is connected to the first port of L1, the other end of S2 is connected to a negative electrode of C1, a positive electrode of C1 is connected to a positive electrode of C2, and a negative electrode of C2 is connected to the first port of L1 through S2.

Optionally, the power conversion apparatus 400 may further include a third switch unit S3 and a fourth switch unit S4. A second port of L1 is connected to the negative electrode of C1 through S3, and the negative electrode of C2 is connected to the negative electrode of C1 through S4.

C2 is further connected to a subsequent circuit, and supplies power to the subsequent circuit, that is, outputs an electrical signal for the subsequent circuit.

Figure 5A:
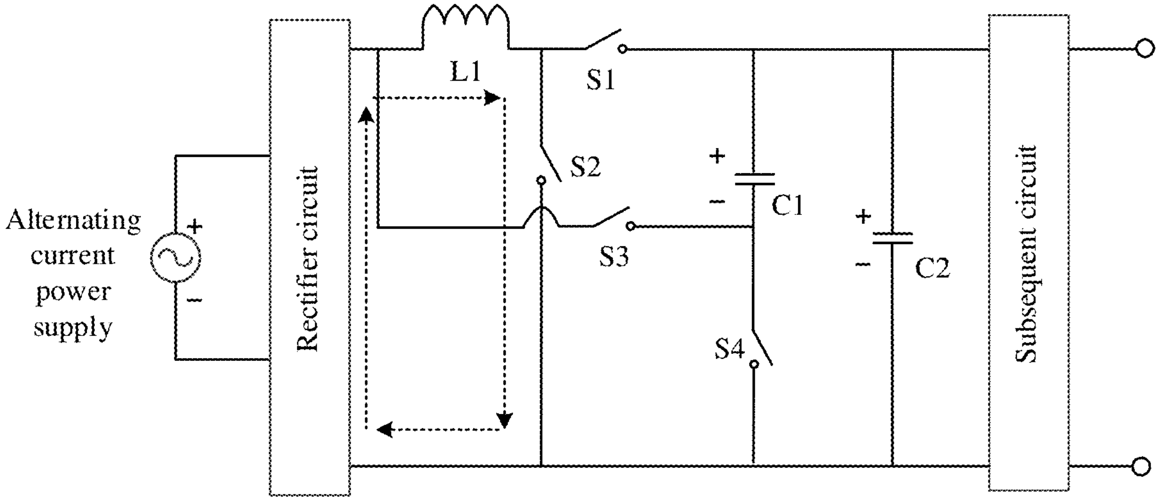
FIG. 5(*a*) is a schematic diagram of a current direction when a power conversion apparatus supplies power normally.
Figure 5B:
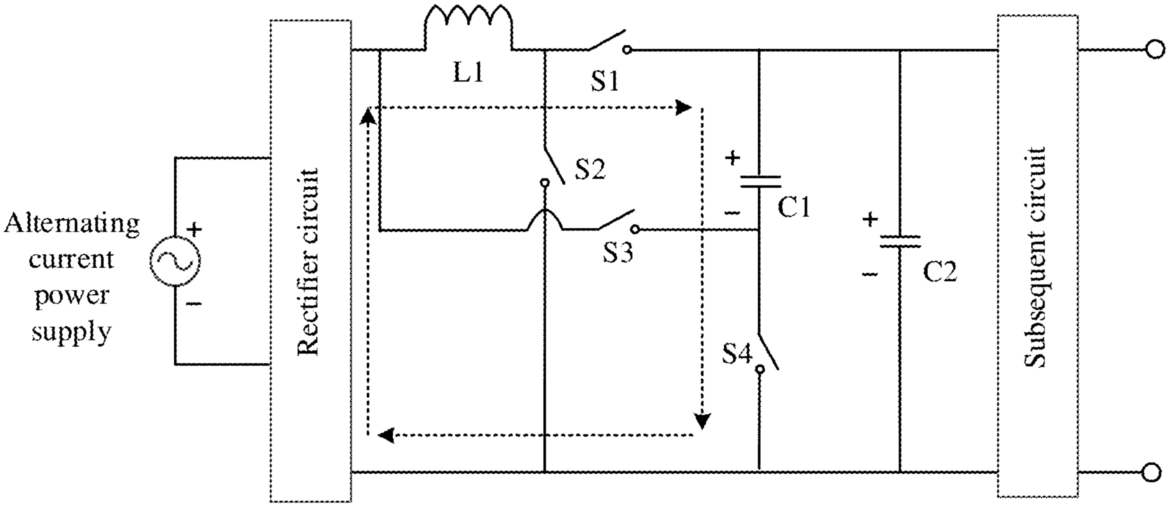

When the apparatus 400 supplies power normally, and S2 is turned on, as shown in FIG. 5(*a*), a current loop may be formed between L1 and a rectifier circuit. When the apparatus 400 supplies power normally, and S1 is turned on, as shown in FIG. 5(*b*), a current loop may be formed between L1, the rectifier circuit, and C1. S1 and S2 are alternately turned on, so that L1 may adjust phases of a current and a voltage that are of the first direct current and that are output by the rectifier circuit, and output an adjusted second direct current to C1. C1 may filter the second direct current to obtain a filtered third direct current, and output the third direct current to the subsequent circuit, so that the subsequent circuit may normally supply power to a power-consuming device.

In this embodiment, alternately turning on S1 and S2 may be understood as turning off S2 when S1 is turned on, or turning off S1 when S2 is turned on.

When an input power failure occurs in the power conversion apparatus 400, that is, when an alternating current power supply stops supplying power to the rectifier circuit, a switch unit is controlled, so that the apparatus 400 alternates between a first working state and a second working state. The first working state includes: a first current loop is formed between L1 and C1; and in the first current loop, C1 supplies electric energy to L1, and L1 stores energy released by C1. The second working state includes: A second current loop is formed between L1, C2, and C1; and in the second current loop, C1 and L1 are connected in series to supply electric energy to C2, and C2 stores energy released by C1 and L1.

Figure 6A:
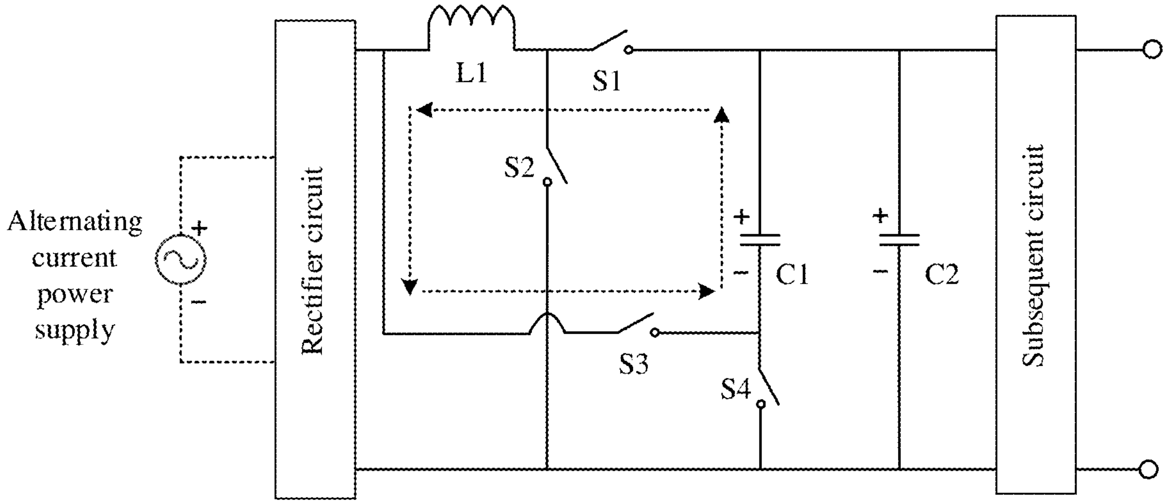
FIG. 6(*a*) is a schematic diagram of a current direction when a power failure occurs in a power conversion apparatus.
Figure 6B:
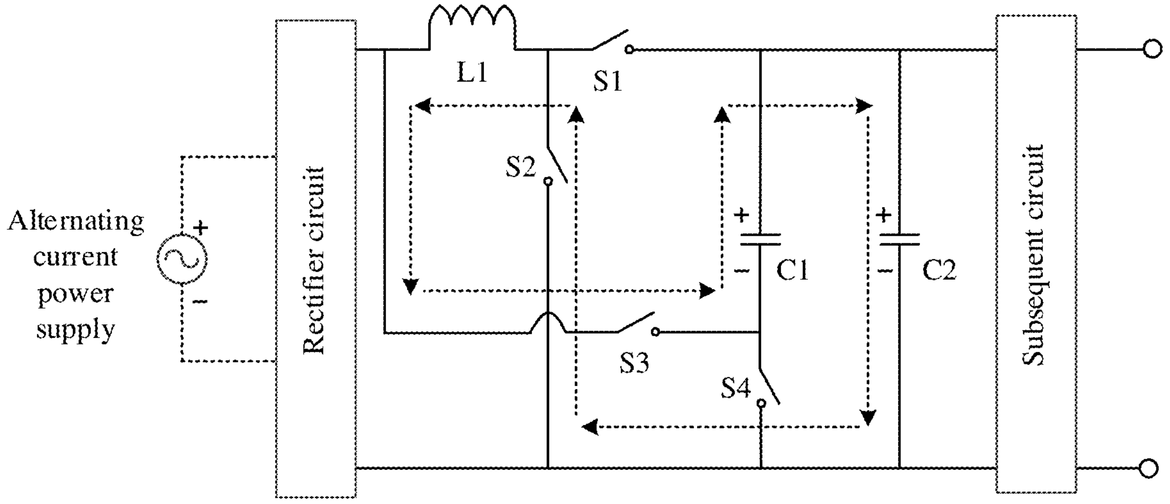

The apparatus 400 may operate in the first working state by controlling S1 and S3 to be turned on and another switch unit to be turned off. When the apparatus 400 operates in the first working state, a current direction between L1 and C1 is shown in FIG. 6(*a*).

The apparatus 400 may operate in the second working state by controlling S2 and S3 to be turned on and another switch unit to be turned off. When the apparatus 400 operates in the second working state, a current direction between L1 and C1 is shown in FIG. 6(*b*).

Because C1 and L1 jointly transfer stored energy to C2, a voltage of C2 may be increased, so that C2 may store more energy, and C2 may supply power to the subsequent circuit for longer time.

In this embodiment, for example, S3 may include a first field effect MOS transistor and a second MOS transistor, the first MOS transistor and the second MOS transistor are connected in series, and a source of the first MOS transistor is connected to a source of the second MOS transistor, or a drain of the first MOS transistor is connected to a drain of the second MOS transistor.

In this embodiment, in another example, S3 may include a MOS transistor and a diode, a negative electrode of the diode is connected to a negative electrode of C1, a positive electrode of the diode is connected to a source of the MOS transistor, and a drain of the MOS transistor is connected to a second port of L1.

In this embodiment, for example, S4 may include a field effect MOS transistor, a gallium nitride (GaN) transistor, a silicon carbide (SiC) transistor, or an insulated gate bipolar transistor (IGBT).

In this embodiment, for example, S1 may include a field effect MOS transistor, a GaN transistor, a SiC transistor, or an IGBT.

Optionally, in some possible implementations, S1 may include a diode, and a positive electrode of the diode in the first switch unit is connected to the first port of the first inductor.

Optionally, in some possible implementations, S1 may include a first MOS transistor and a second MOS transistor, the first MOS transistor and the second MOS transistor are connected in series, and a source of the first MOS transistor is connected to a source of the second MOS transistor, or a drain of the first MOS transistor is connected to a drain of the second MOS transistor.

In this embodiment, in another example, S2 may include a field effect MOS transistor, a GaN transistor, a SiC transistor, or an IGBT.

Figure 7A:
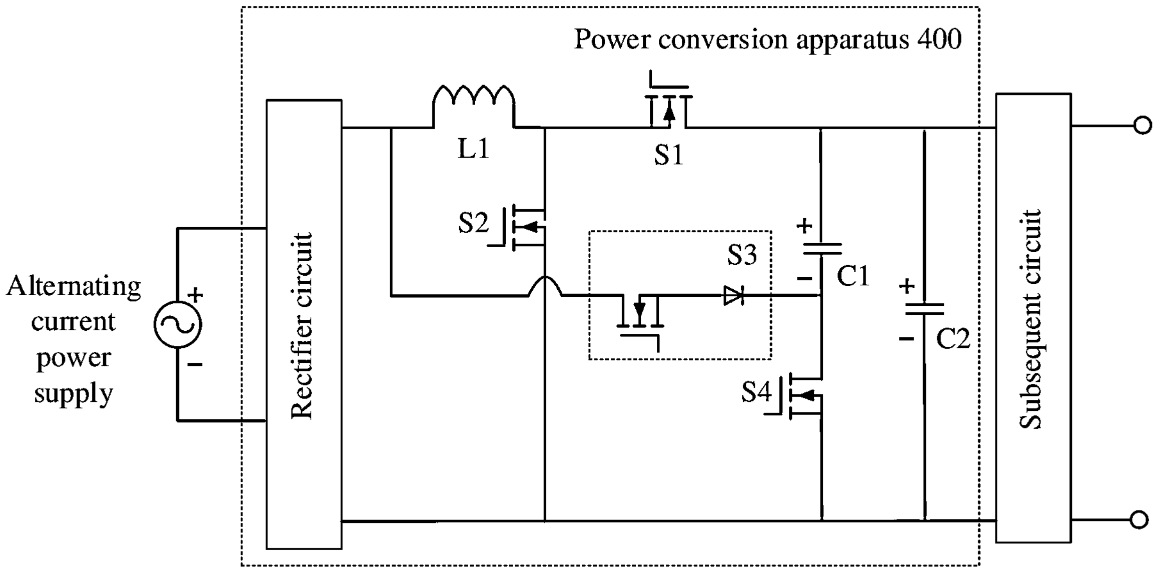
FIG. 7(*a*) is an example diagram of a structure of a switch unit according to an embodiment.
Figure 7B:
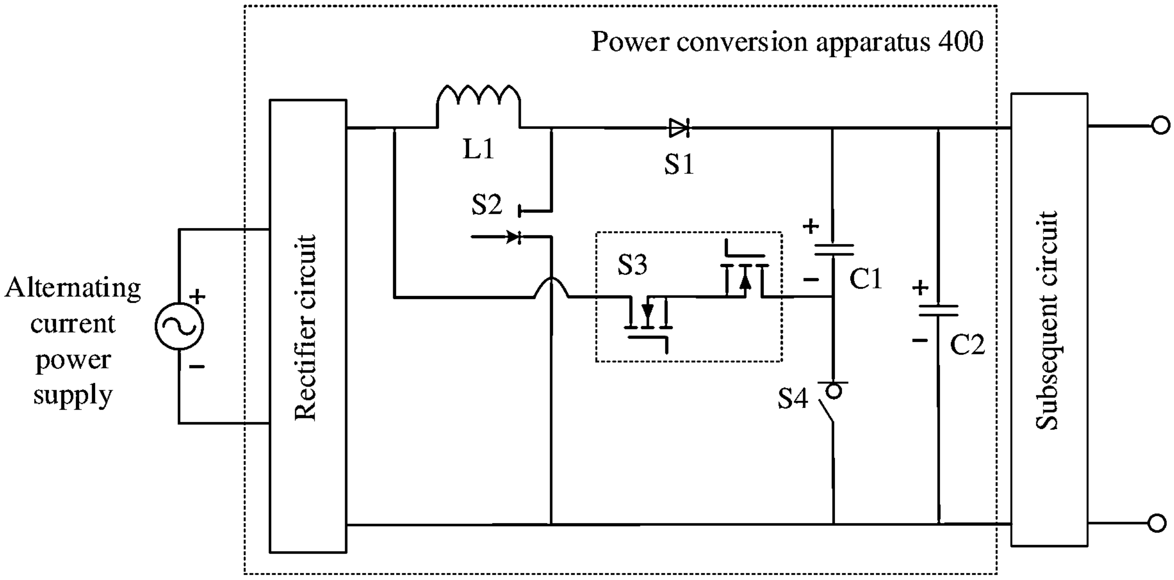

When S3 includes a MOS transistor and a diode, and S1, S2, and S4 separately include a MOS transistor, a schematic diagram of a structure of the apparatus 400 is shown in FIG. 7(*a*).

When S3 includes two counter-top MOS transistors, S2 includes a MOS transistor, S4 includes a relay, and S1 includes a diode, a schematic diagram of a structure of the apparatus 400 is shown in FIG. 7(*b*).

Figure 8:
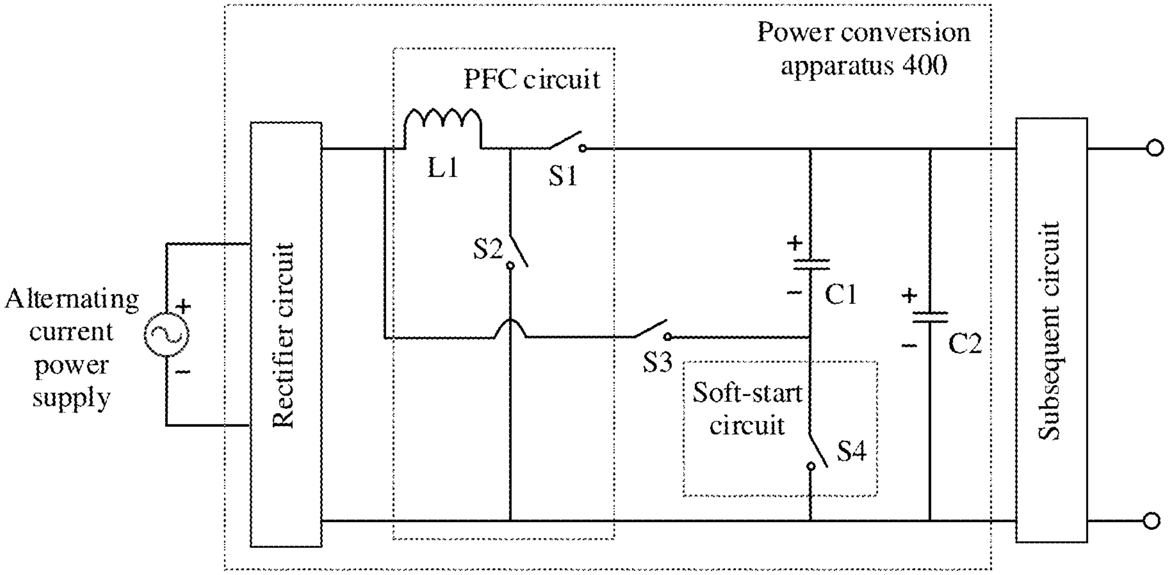
FIG. 8 is an example diagram of a structure of a power conversion apparatus including a soft-start circuit.

In this embodiment, optionally, as shown in FIG. 8, the power conversion apparatus 400 may further include a soft-start circuit, the soft-start circuit may include S4, and the soft-start circuit is configured to control a rising slope and an amplitude of an input current of C1.

The soft-start circuit may be configured to: when the PFC circuit initially receives the first direct current, soft-start C1. This may prevent C1 from being damaged due to strong current impact caused by an excessive large current or voltage of the first direct current. Therefore, the circuit is protected.

Figure 9:
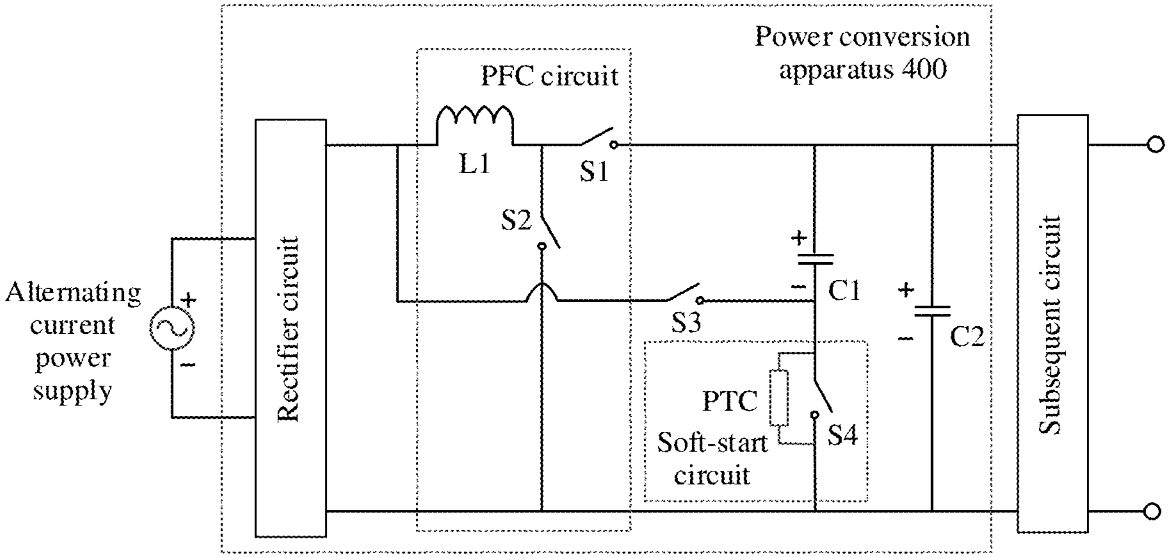
FIG. 9 is an example diagram of a structure of a soft-start circuit according to an embodiment.

Optionally, as shown in FIG. 9, the soft-start circuit may further include a positive temperature coefficient (PTC) thermistor, and the PTC thermistor and S4 are connected in parallel.

A resistance value of the PTC thermistor increases stepwise as a temperature of the PTC thermistor increases. A higher temperature indicates a larger resistance value. For example, when the PFC circuit initially receives the first direct current, or when the alternating current power supply is initially input to the power conversion apparatus, a large impulse current is easily generated in the power conversion apparatus. As a result, an overcurrent situation occurs in the soft-start circuit. In this case, because the PTC thermistor generates heat, power of the PTC thermistor increases, resulting in an increase of a temperature of the PTC thermistor. When the temperature exceeds a specific temperature, the resistance value increases instantly, and a current in the loop decreases rapidly to a safe value.

In this embodiment, the PTC thermistor is added in the soft-start circuit. This may prevent a case in which power loss is increased when a separate switch component is used as the soft-start circuit and power efficiency is affected.

In the embodiments, the rectifier circuit may be implemented by using a plurality of circuit structures, for example, a bridged structure and a bridgeless structure. The bridged structure means that the rectifier circuit includes four diodes, and the four diode ports are connected to form a "bridge" structure, to convert an alternating current into a unidirectional direct current. The bridgeless structure means that the rectifier circuit includes two diodes, there are two more diodes in the bridgeless structure than those in a bridged rectifier circuit. This may reduce a conduction loss and improve power efficiency.

When a structure of the rectifier circuit is different, the PFC circuit in the power conversion apparatus is different. For example, when the rectifier circuit is of the bridged structure, the PFC circuit in the power conversion apparatus may be referred to as a bridged PFC circuit. For another example, when the rectifier circuit is of the bridgeless structure, and the PFC circuit includes one inductor, the PFC circuit in the power conversion apparatus may be referred to as a bridgeless PFC circuit. For another example, when the rectifier circuit is of the bridgeless structure, and the PFC circuit includes two inductors, the PFC circuit in the power conversion apparatus may be referred to as a dual-boost (boost) bridgeless PFC circuit.

Figure 10A:
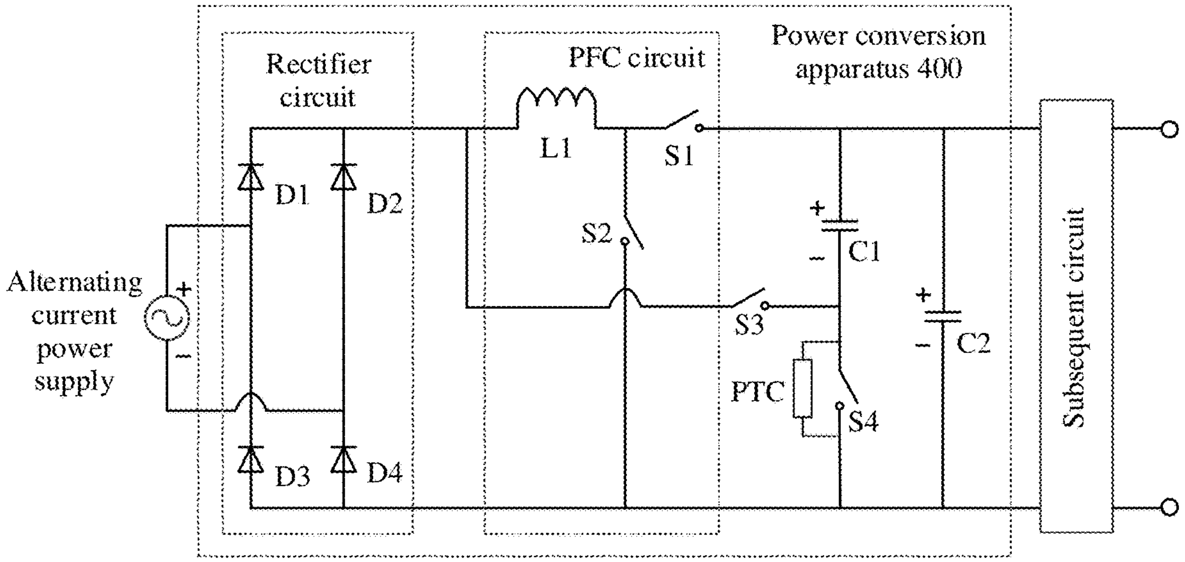
FIG. 10(*a*) is a schematic diagram of a structure of a rectifier circuit according to an embodiment.
Figure 10B:
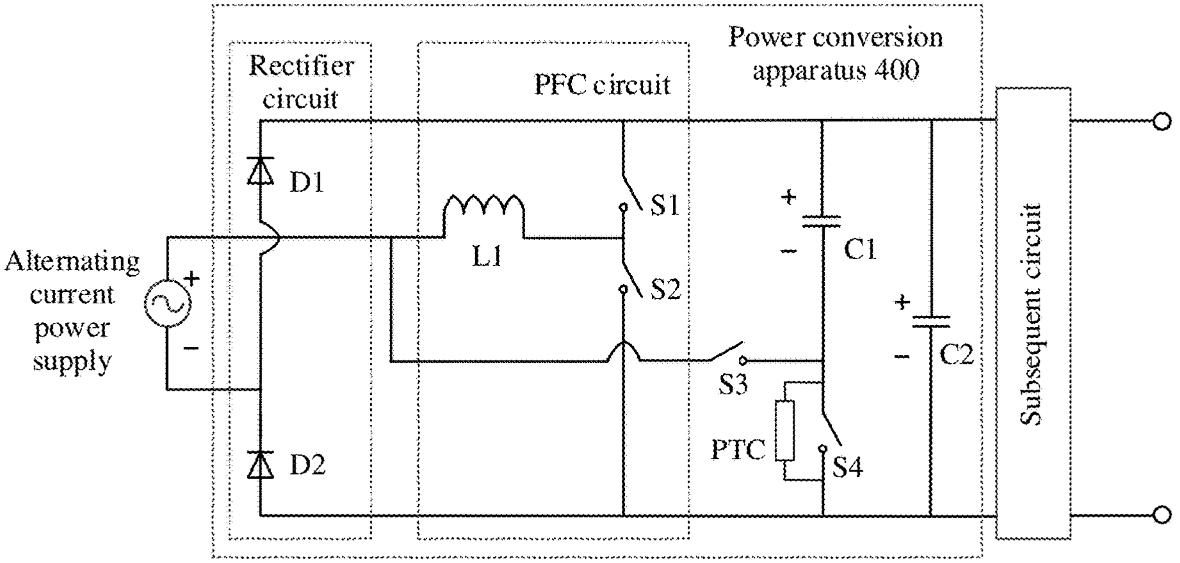
Figure 10C:
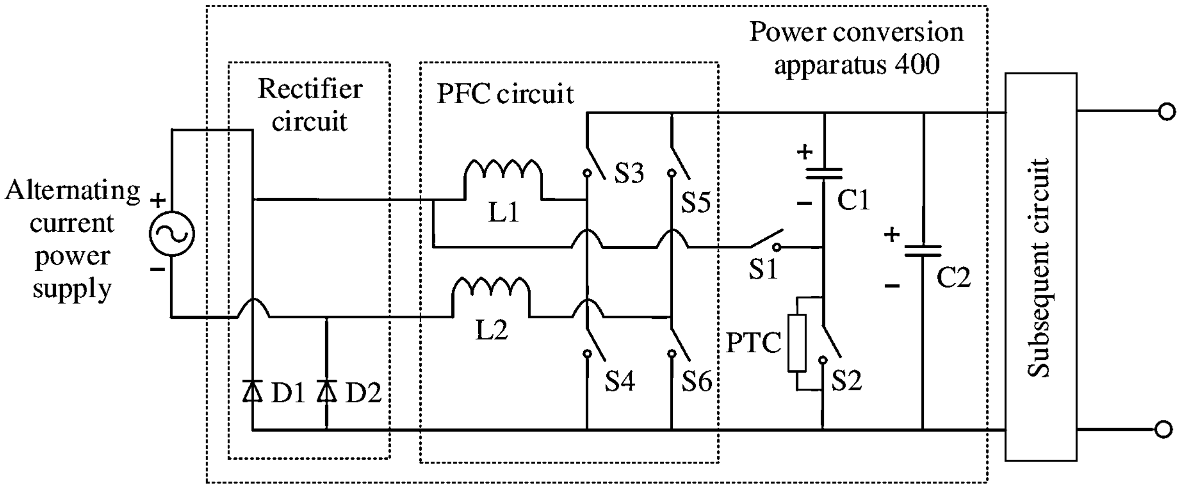

When the rectifier circuit is a bridged rectifier circuit, an example diagram of a structure of the apparatus 400 is shown in FIG. 10(*a*).

When the rectifier circuit is a bridgeless rectifier circuit, and the PFC circuit includes one PFC inductor, an example diagram of a structure of the apparatus 400 is shown in FIG. 10(*b*).

When the rectifier circuit is a bridgeless rectifier circuit, and the PFC circuit includes two PFC inductors, an example diagram of a structure of the apparatus 400 is shown in FIG. 10(*c*).

Figure 11:
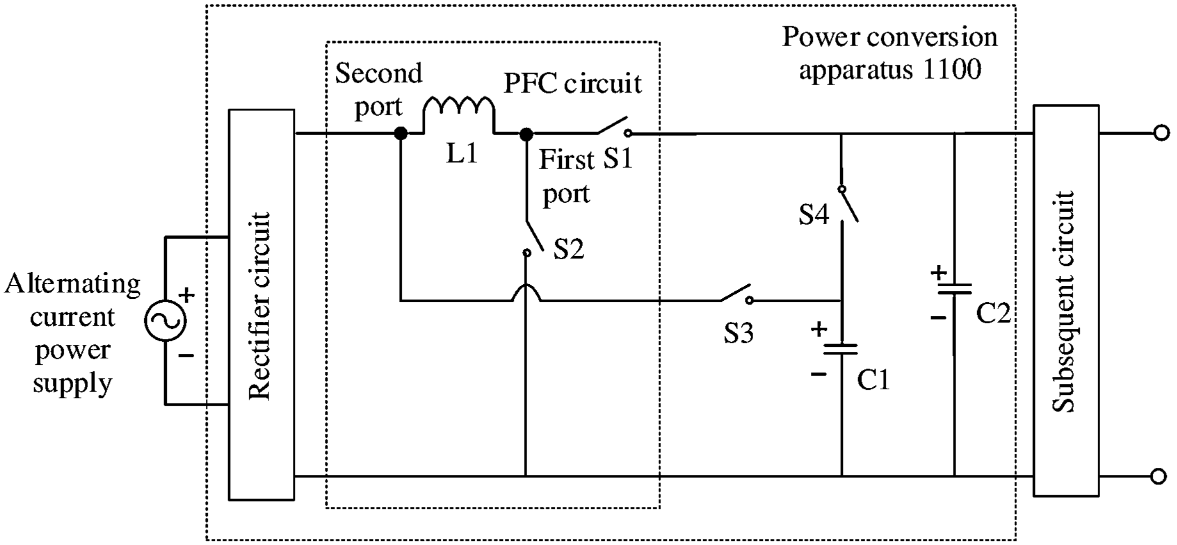
FIG. 11 is an example diagram of a structure of a power conversion apparatus according to still another embodiment.

An example diagram of a structure of a power conversion apparatus 1100 according to another embodiment is shown in FIG. 11. The power conversion apparatus 1100 may include a rectifier circuit, a PFC circuit, C1, S1, S2, S3, and S4, and an auxiliary capacitor C2.

A difference between the apparatus 1100 in this embodiment and the apparatus 300 lies in that: S3 is connected to a second port of L1 and a positive electrode of C1, one end of S1 is connected to a first port of L1, the other end of S1 is connected to the positive electrode of C1 through S4, the other end of S1 is connected to a positive electrode of C2, and a negative electrode of C2 is connected to a negative electrode of C1.

Figure 12A:
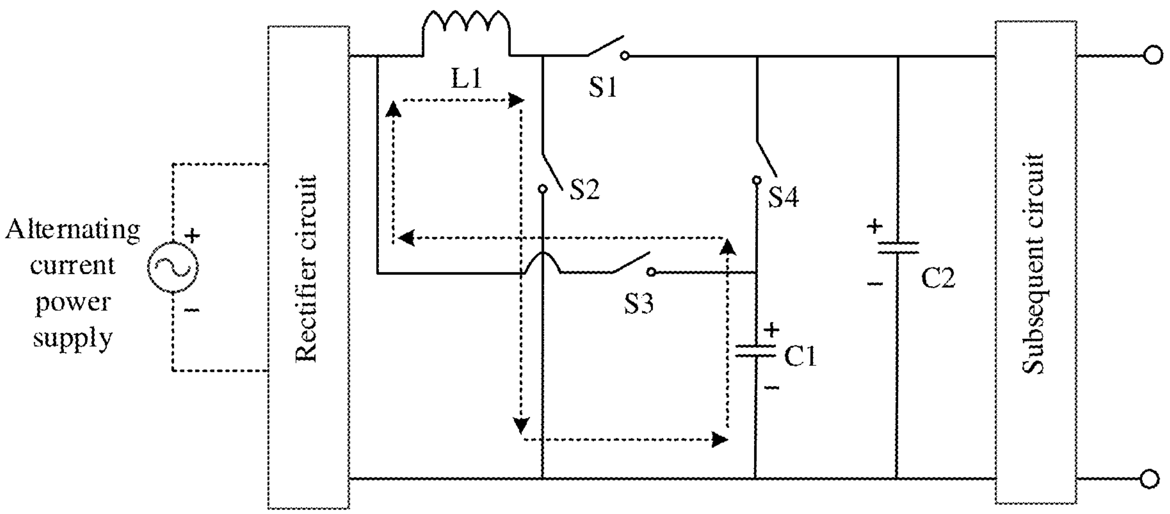
FIG. 12(*a*) is a schematic diagram of a current direction when a power failure occurs in a power conversion apparatus.
Figure 12B:
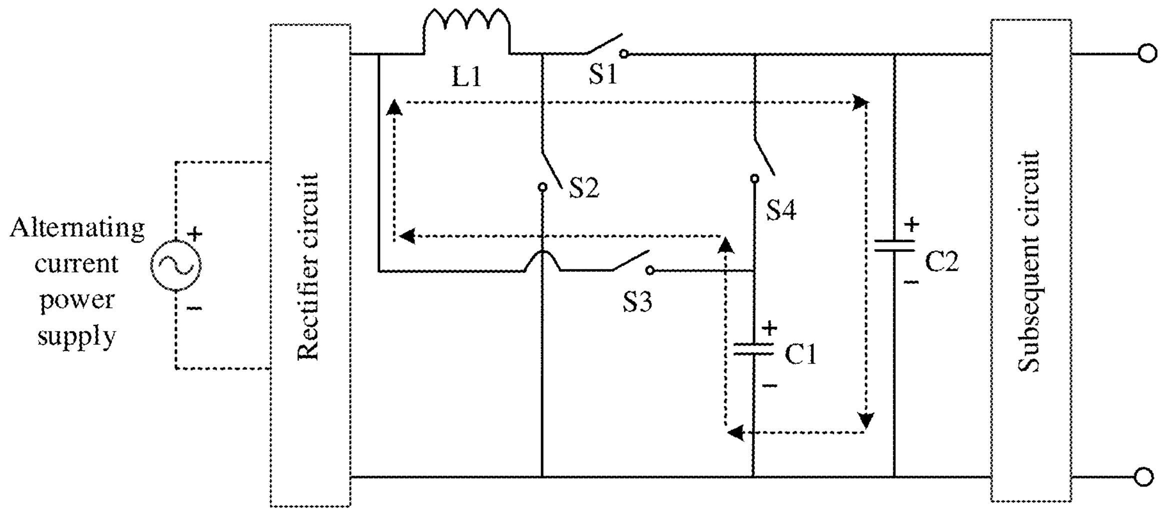

When an input power failure occurs in the power conversion apparatus 1100, that is, when an alternating current power supply stops supplying power to the rectifier circuit, a switch unit is controlled, so that the apparatus 1100 alternates between a first working state and a second working state. S2 and S3 may be controlled to be turned on, and another switch unit may be turned off, so that the apparatus 1100 operates in the first working state. When the apparatus 1100 operates in the first working state, a current direction between L1 and C1 is shown in FIG. 12(*a*).

The apparatus 1100 may operate in the second working state by controlling S1 and S3 to be turned on and another switch unit to be turned off. When the apparatus 1100 operates in the second working state, a current direction between L1 and C1 is shown in FIG. 12(*b*).

Because C1 and L1 jointly transfer stored energy to C2, a voltage of C2 may be increased, so that C2 may store more energy, and C2 may supply power to a subsequent circuit for longer time.

In this embodiment, for example, S3 may include a first field effect MOS transistor and a second MOS transistor, the first MOS transistor and the second MOS transistor are connected in series, and a source of the first MOS transistor is connected to a source of the second MOS transistor, or a drain of the first MOS transistor is connected to a drain of the second MOS transistor.

In this embodiment, in another example, S3 may include a MOS transistor and a diode, a positive electrode of the diode is connected to a positive electrode of the bus capacitor, a negative electrode of the diode is connected to a drain of the MOS transistor, and a source of the MOS transistor is connected to the first port of the PFC circuit.

In this embodiment, for example, S4 may include a field effect MOS transistor, a GaN transistor, a SiC transistor, or an IGBT.

In this embodiment, for example, S2 may include a field effect MOS transistor, a GaN transistor, a SiC transistor, or an IGBT.

In this embodiment, in another example, S1 may include a diode, and a positive electrode of the diode is connected to the first port of L1.

In this embodiment, for example, S3 may include a field effect MOS transistor, a gallium nitride GaN transistor, a silicon carbide SiC transistor, or an insulated gate bipolar transistor IGBT.

Figure 13:
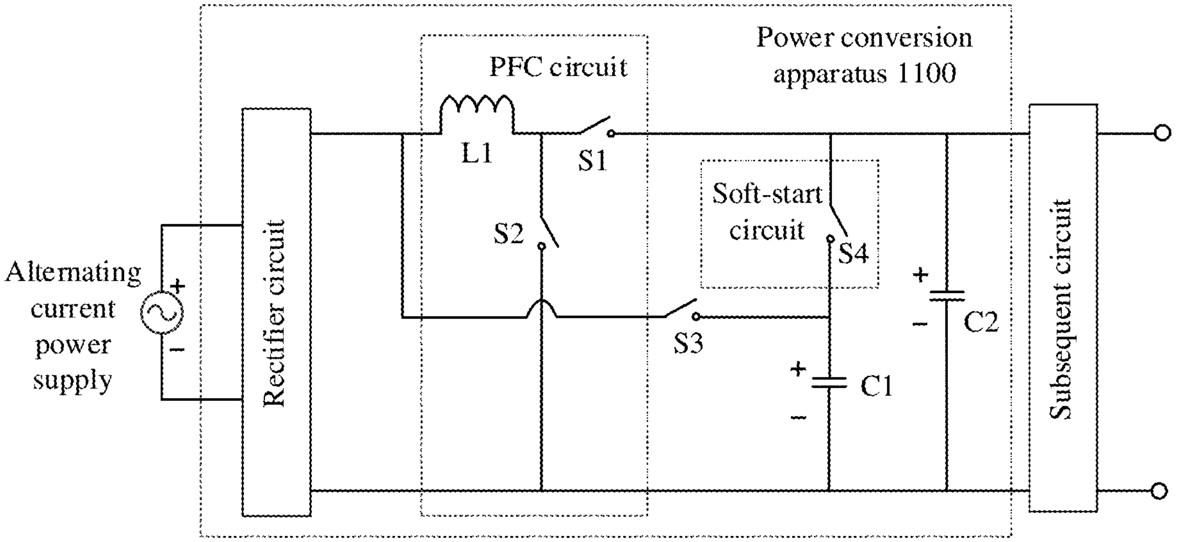
FIG. 13 is an example diagram of a structure of a power conversion apparatus 1100 including a soft-start circuit according to the embodiments.

In this embodiment, optionally, as shown in FIG. 13, the power conversion apparatus 1100 may further include a soft-start circuit, and the soft-start circuit may include S4.

Figure 14:
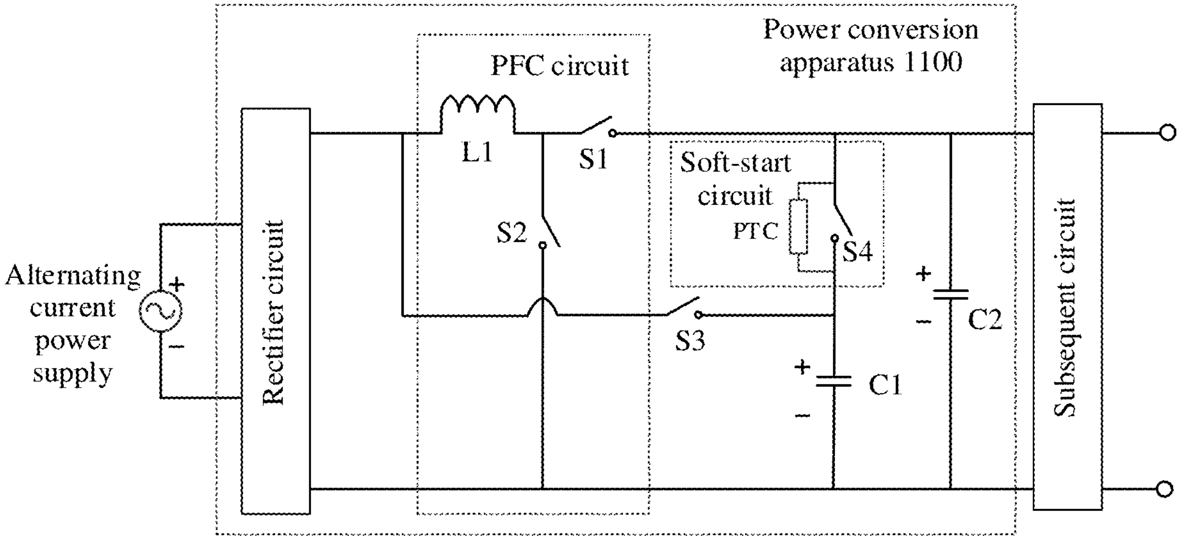
FIG. 14 is an example diagram of a structure of a soft-start circuit according to another embodiment.

Optionally, as shown in FIG. 14, the soft-start circuit may further include a positive temperature coefficient (PTC) thermistor, and the PTC thermistor and S4 are connected in parallel.

It may be understood that, for a specific implementation of the rectifier circuit and/or the subsequent circuit in the apparatus 1100, refer to related content in the apparatus 300. Details are not described herein again.

The apparatus in the foregoing embodiments may further include the subsequent circuit.

An embodiment further provides a control method for the foregoing power conversion apparatus. The power conversion apparatus may include a rectifier circuit, a power factor correction (PFC) circuit, a bus capacitor, and an auxiliary capacitor. The rectifier current, the PFC circuit, the bus capacitor, and the auxiliary capacitor are sequentially connected. The rectifier circuit is configured to convert a received alternating current into a first direct current. The PFC circuit is configured to compensate a phase between a current and a voltage of the received first direct current to obtain a second direct current. The bus capacitor is configured to filter the second direct current to obtain a third direct current. The auxiliary capacitor is configured to release, for a subsequent circuit, electric energy stored in the auxiliary capacitor.

The control method for the power conversion apparatus may include: when an input power failure occurs in the rectifier circuit, controlling the power conversion apparatus to be in a first working state or a second working state.

The first working state includes: the bus capacitor and the first inductor form a first current loop; and in the first current loop, the bus capacitor supplies electric energy to the first inductor, and the first inductor stores electric energy released by the bus capacitor.

The second working state includes: the auxiliary capacitor, the bus capacitor, and the first inductor form a second current loop; and in the second current loop, the bus capacitor and the first inductor are connected in series to supply electric energy to the auxiliary capacitor, and the auxiliary capacitor stores electric energy released by the bus capacitor and the first inductor.

In some possible implementations, the PFC circuit may include a first switch unit and a second switch unit. A first port of the first inductor is connected to a positive electrode of the bus capacitor through the first switch unit, the first port of the first inductor is connected to a negative electrode of the bus capacitor through the second switch unit, the positive electrode of the bus capacitor is connected to a positive electrode of the auxiliary capacitor, and a negative electrode of the auxiliary capacitor is connected to the first port of the first inductor through the second switch unit. The power conversion apparatus may further include a third switch unit and a fourth switch unit. A second port of the first inductor is connected to the negative electrode of the bus capacitor through the third switch unit, and the negative electrode of the auxiliary capacitor is connected to the negative electrode of the bus capacitor through the fourth switch unit.

The controlling the power conversion apparatus to be in a first working state or a second working state includes: controlling the first switch unit and the third switch unit to be turned on, and controlling the second switch unit and the fourth switch unit to be turned off, so that the power conversion apparatus is in the first working state; and controlling the second switch unit and the third switch unit to be turned on, and controlling the first switch unit and the fourth switch unit to be turned off, so that the power conversion apparatus is in the second working state.

In some other possible implementations, the PFC circuit may include a first switch unit and a second switch unit. A first port of the first inductor is connected to a positive electrode of the bus capacitor through the first switch unit, the first port of the first inductor is connected to a negative electrode of the bus capacitor through the second switch unit, a positive electrode of the auxiliary capacitor is connected to the first port of the first inductor through the first switch unit, and the negative electrode of the bus capacitor is connected to a negative electrode of the auxiliary capacitor. The power conversion apparatus may further include a third switch unit and a fourth switch unit. A second port of the first inductor is connected to the positive electrode of the bus capacitor through the third switch unit, and the positive electrode of the auxiliary capacitor is connected to the positive electrode of the bus capacitor through the fourth switch unit.

The controlling the power conversion apparatus to be in a first working state or a second working state includes: controlling the second switch unit and the third switch unit to be turned on, and controlling the first switch unit and the fourth switch unit to be turned off, so that the power conversion apparatus is in the first working state; and controlling the first switch unit and the third switch unit to be turned on, and controlling the second switch unit and the fourth switch unit to be turned off, so that the power conversion apparatus is in the second working state.

In this embodiment, each switch unit in the power conversion apparatus is controlled by using the control method, so that the power conversion apparatus is in the first working state or the second working state.

For example, the switch unit may be controlled to be in a closed state by transmitting a signal to the switch unit. Optionally, in some embodiments, when the switch unit is a diode, the diode may be conducted or cut off by controlling on or off of another switch unit.

In an embodiment, a control apparatus for the power conversion apparatus is further provided, and is configured to implement the foregoing control method. The control apparatus may be implemented by using software and/or hardware.

The power conversion apparatus may include a rectifier circuit, a PFC circuit, a bus capacitor, and an auxiliary capacitor. The rectifier current, the PFC circuit, the bus capacitor, and the auxiliary capacitor are sequentially connected. The rectifier circuit is configured to convert a received alternating current into a first direct current. The PFC circuit is configured to compensate a phase between a current and a voltage of the received first direct current to obtain a second direct current. The bus capacitor is configured to filter the second direct current to obtain a third direct current. The auxiliary capacitor is configured to release, for a subsequent circuit, electric energy stored in the auxiliary capacitor.

The control apparatus for the power conversion apparatus may be configured to: when an input power failure occurs in the rectifier circuit, control the power conversion apparatus to be in a first working state or a second working state.

The first working state includes: the bus capacitor and the first inductor form a first current loop; and in the first current loop, the bus capacitor supplies electric energy to the first inductor, and the first inductor stores electric energy released by the bus capacitor.

The second working state includes: the auxiliary capacitor, the bus capacitor, and the first inductor form a second current loop; and in the second current loop, the bus capacitor and the first inductor are connected in series to supply electric energy to the auxiliary capacitor, and the auxiliary capacitor stores electric energy released by the bus capacitor and the first inductor.

In an example, the PFC circuit may include a first switch unit and a second switch unit. A first port of the first inductor is connected to a positive electrode of the bus capacitor through the first switch unit, the first port of the first inductor is connected to a negative electrode of the bus capacitor through the second switch unit, the positive electrode of the bus capacitor is connected to a positive electrode of the auxiliary capacitor, and a negative electrode of the auxiliary capacitor is connected to the first port of the first inductor through the second switch unit. The power conversion apparatus may further include a third switch unit and a fourth switch unit. A second port of the first inductor is connected to the negative electrode of the bus capacitor through the third switch unit, and the negative electrode of the auxiliary capacitor is connected to the negative electrode of the bus capacitor through the fourth switch unit.

The control apparatus for the power conversion apparatus may be configured to: control the first switch unit and the third switch unit to be turned on, and control the second switch unit and the fourth switch unit to be turned off, so that the power conversion apparatus is in the first working state; and control the second switch unit and the third switch unit to be turned on, and control the first switch unit and the fourth switch unit to be turned off, so that the power conversion apparatus is in the second working state.

In another example, the PFC circuit may include a first switch unit and a second switch unit. A first port of the first inductor is connected to a positive electrode of the bus capacitor through the first switch unit, the first port of the first inductor is connected to a negative electrode of the bus capacitor through the second switch unit, a positive electrode of the auxiliary capacitor is connected to the first port of the first inductor through the first switch unit, and the negative electrode of the bus capacitor is connected to a negative electrode of the auxiliary capacitor. The power conversion apparatus may further include a third switch unit and a fourth switch unit. A second port of the first inductor is connected to the positive electrode of the bus capacitor through the third switch unit, and the positive electrode of the auxiliary capacitor is connected to the positive electrode of the bus capacitor through the fourth switch unit.

The control apparatus for the power conversion apparatus may be configured to: control the second switch unit and the third switch unit to be turned on, and control the first switch unit and the fourth switch unit to be turned off, so that the power conversion apparatus is in the first working state; and control the first switch unit and the third switch unit to be turned on, and control the second switch unit and the fourth switch unit to be turned off, so that the power conversion apparatus is in the second working state.

In an example, the control apparatus may include a controller and a drive circuit. The controller may execute instructions. When the controller specifies the instructions, the drive circuit may transmit a turn-on or turn-off signal to a corresponding switch unit in the power conversion apparatus, to enable the power conversion apparatus to operate in the first working state or the second working state.

Figure 15:
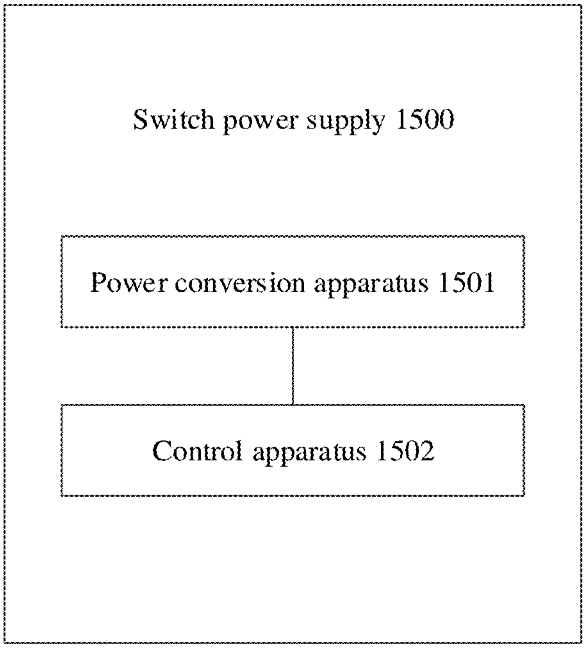
FIG. 15 is a schematic diagram of a structure of a switch-mode power supply according to an embodiment.

FIG. 15 is a schematic diagram of a structure of a switch-mode power supply 1500 according to an embodiment. The switch-mode power supply may include a power adapter (commonly referred to as a charger). For example, the switch-mode power supply may be used as a power supply for a server or a network device such as a router switch, and may be used as a communication power supply, an uninterruptible power supply (UPS), a light-emitting diode (LED) lighting power supply, to supply power to various electronic devices such as a display, a server, and a network device.

As shown in FIG. 15, the switch-mode power supply 1500 may include a power conversion apparatus 1501 and a control apparatus 1502. Optionally, the power supply 1500 may further include a first interface and a second interface.

The first interface, the power conversion apparatus 1501, the control apparatus 1502, and the second interface are sequentially connected.

The first interface may be configured to: connect to a power sourcing equipment (or a power supply), and transmit, to the power conversion apparatus 1501, a current signal output by the power sourcing equipment. The power sourcing equipment may be a direct current power supply or an alternating current power supply. Generally, when the power sourcing equipment is the alternating current power supply, the power conversion apparatus 1501 may be any power conversion apparatus in the foregoing embodiments.

The control apparatus 1502 may be an apparatus that is configured to control the foregoing power conversion apparatus 1501 to operate in the foregoing first working state or the foregoing second working state.

The second interface is configured to: connect to a power-consuming device, and output a direct current signal to the power-consuming device.

In various embodiments, unless otherwise stated or there is a logic conflict, terms and/or descriptions in different embodiments are consistent and may be mutually referenced, and features in different embodiments may be combined based on an internal logical relationship thereof, to form a new embodiment. The term "a plurality of" means two or more than two. The term "and/or" describes only an association relationship for describing associated objects and represents that three relationships may exist. For example, A and/or B may represent the following three cases: only A exists, both A and B exist, and only B exists. In addition, the character "/" can indicate an "or" relationship between the associated objects. In the formula, the character "/" indicates a "division" relationship between the associated objects.

It may be understood that a connection manner of positive and negative electrodes of an alternating current power supply and a connection manner between circuit units in the embodiments are simple examples, and are not intended to limit the scope of the embodiments.

It may be understood that various numbers in embodiments are merely used for differentiation for ease of description, and are not used to limit the scope of the embodiments.

It should be understood that sequence numbers of the foregoing processes do not mean execution sequences in the embodiments. The execution sequences of the processes should be determined according to functions and internal logic of the processes, and should not be construed as any limitation on the implementation processes of the embodiments.

What is claimed is:

1. An apparatus comprising:

a rectifier circuit configured to convert a received alternating current into a first direct current;

a power factor correction (PFC) circuit configured to compensate a phase between a current and a voltage of the received first direct current to obtain a second direct current;

a bus capacitor configured to filter the second direct current to obtain a third direct current, wherein a first inductor in the PFC circuit and the bus capacitor are configured to form a first current loop, the bus capacitor supplies electric energy to the first inductor, and the first inductor stores electric energy released by the bus capacitor; and an auxiliary capacitor configured to supply electric energy to a subsequent circuit and store electric energy released by the bus capacitor and the first inductor, wherein the auxiliary capacitor, the bus capacitor, and the first inductor are configured to form a second current loop, and the bus capacitor and the first inductor are connected in series in the second current loop to supply electric energy to the auxiliary capacitor.

2. The apparatus according to claim 1, wherein the first inductor, the bus capacitor, and the auxiliary capacitor are connected through a switch circuit, and the switch circuit is configured to:

after a power failure occurs in the rectifier circuit, conduct the first current loop or the second current loop.

3. The apparatus according to claim 2, wherein the switch circuit further comprises:

a first switch unit, wherein a first port of the first inductor is connected to a positive electrode of the bus capacitor through the first switch unit;

a second switch unit, wherein the first port of the first inductor is connected to a negative electrode of the bus capacitor through the second switch unit and the positive electrode of the bus capacitor is connected to a positive electrode of the auxiliary capacitor, and a negative electrode of the auxiliary capacitor is connected to the first port of the first inductor through the second switch unit;

a third switch unit, wherein a second port of the first inductor is connected to the negative electrode of the bus capacitor through the third switch unit; and a fourth switch unit, wherein the negative electrode of the auxiliary capacitor is connected to the negative electrode of the bus capacitor through the fourth switch unit.

4. The apparatus according to claim 3, wherein the PFC circuit further comprises the first switch unit and the second switch unit.

5. The apparatus according to claim 3, wherein the third switch unit further comprises a MOS transistor and a diode, a negative electrode of the diode is connected to the negative electrode of the bus capacitor, a positive electrode of the diode is connected to a source of the MOS transistor, and a drain of the MOS transistor is connected to the second port of the first inductor.

6. The apparatus according to claim 2, wherein the switch circuit further comprises:

a first switch unit, wherein a first port of the first inductor is connected to a positive electrode of the bus capacitor through the first switch unit, a positive electrode of the auxiliary capacitor is connected to the first port of the first inductor through the first switch unit, and the negative electrode of the bus capacitor is connected to a negative electrode of the auxiliary capacitor;

a second switch unit, wherein the first port of the first inductor is connected to a negative electrode of the bus capacitor through the second switch unit;

a third switch unit, wherein a second port of the first inductor is connected to the positive electrode of the bus capacitor through the third switch unit; and a fourth switch unit, wherein the positive electrode of the auxiliary capacitor is connected to the positive electrode of the bus capacitor through the fourth switch unit.

7. The apparatus according to claim 6, wherein the PFC circuit further comprises the first switch unit and the second switch unit.

8. The apparatus according to claim 6, wherein the third switch unit further comprises a MOS transistor and a diode, a positive electrode of the diode is connected to the positive electrode of the bus capacitor, a negative electrode of the diode is connected to a drain of the MOS transistor, and a source of the MOS transistor is connected to the second port of the first inductor.

9. The apparatus according to claim 7, wherein the first switch unit further comprises a diode, and a positive electrode of the diode in the first switch unit is connected to the first port of the first inductor.

10. The apparatus according to claim 9, wherein the first switch unit further comprises a first field effect MOS transistor and a second MOS transistor, the first MOS transistor and the second MOS transistor are connected in series, and a source of the first MOS transistor is connected to a source of the second MOS transistor.

11. The apparatus according to claim 3, further comprising: comprises:

a soft-start circuit configured to control a rising slope and an amplitude of an input current of the bus capacitor, wherein the soft-start circuit comprises the fourth switch unit.

12. The apparatus according to claim 11, wherein the soft-start circuit further comprises a resistance unit, and the resistance unit and the fourth switch unit are connected in parallel.

13. The apparatus according to claim 3, wherein the rectifier circuit further comprises:

a first diode, a second diode, wherein a negative electrode of the first diode and a negative electrode of the second diode are connected to a third port of the rectifier circuit;

a third diode, wherein a positive electrode of the first diode and a negative electrode of the third diode are connected to a first port of the rectifier circuit; and a fourth diode, wherein the first port of the rectifier circuit is configured to connect to one electrode of an alternating current power supply, a positive electrode of the second diode and a negative electrode of the fourth diode are connected to a second port of the rectifier current, the second port of the rectifier circuit is configured to connect to the other electrode of the alternating current power supply, a positive electrode of the third diode and a positive electrode of the fourth diode are connected to a fourth port of the rectifier current, the third port of the rectifier circuit is connected to a first port of the PFC circuit, and a fourth port of the rectifier circuit is connected to a second port of the PFC circuit; and the first port of the PFC circuit is a port in the PFC circuit that is connected to the first inductor, and the second port of the PFC circuit is a port in the PFC circuit that is connected to the second switch unit.

14. The apparatus according to claim 4, wherein the rectifier circuit further comprises:

a first diode, wherein a negative electrode of the first diode is connected to a second port of the rectifier circuit; and a second diode, wherein a positive electrode of the second diode is connected to a third port of the rectifier circuit, a positive electrode of the first diode and a negative electrode of the second diode are connected to a first port of the rectifier circuit, a positive electrode of the second diode is connected to a third port of the rectifier circuit;

the first port of the rectifier circuit is configured to connect to a negative electrode of an alternating current power supply, a first port of the PFC circuit is configured to connect to a positive electrode of the alternating current power supply, the second port of the rectifier circuit is connected to a second port of the PFC circuit, and the third port of the rectifier circuit is connected to a third port of the PFC circuit; and the first port of the PFC circuit is a port in the PFC circuit that is connected to the first inductor, the second port of the PFC circuit is a port in the PFC circuit that is connected to the first switch unit, and the third port of the PFC circuit is a port in the PFC circuit that is connected to the second switch unit.

15. The apparatus according to claim 4, wherein the rectifier circuit further comprises:

a first diode, wherein a negative electrode of the first diode is connected to a first port of the rectifier circuit; and a second diode, wherein a negative electrode of the second diode is connected to a second port of the rectifier circuit, and a positive electrode of the first diode and a positive electrode of the second diode are connected to a third port of the rectifier circuit;

the PFC circuit further comprises:

a second inductor, wherein a first port of the second inductor is connected to a fourth port of the PFC circuit;

a fifth switch unit, wherein a second port of the fifth switch unit is connected to a second port of the PFC circuit; and a sixth switch unit, wherein a second port of the second inductor, a first port of the fifth switch unit, and a first port of the sixth switch unit are connected, and a second port of the sixth switch unit is connected to a third port of the PFC circuit; and the first port of the rectifier circuit and a first port of the PFC circuit are configured to connect to a positive electrode of an alternating current power supply, the second port of the rectifier circuit and the fourth port of the PFC circuit are configured to connect to a negative electrode of the alternating current power supply, and the third port of the rectifier circuit is connected to the third port of the PFC circuit; and the first port of the PFC circuit is a port in the PFC circuit that is connected to the first inductor, the second port of the PFC circuit is a port in the PFC circuit that is connected to the first switch unit, and the third port of the PFC circuit is a port in the PFC circuit that is connected to the second switch unit.

16. A method for a power conversion apparatus, the method comprising:

converting, with a rectifier circuit, a received alternating current into a first direct current;

compensating, with a power factor correction (PFC) circuit, a phase between a current and a voltage of the first direct current to obtain a second direct current;

filtering, with a bus capacitor, the second direct current to obtain a third direct current;

when an input power failure occurs in the rectifier circuit, controlling the power conversion apparatus to be in either a first working state or a second working state, wherein in the first working state supplying, with the bus capacitor, electric energy to a first inductor;

storing, with the first inductor, electric energy released by the bus capacitor; and in the second working state:

supplying, with the bus capacitor and the first inductor, electric energy to the auxiliary capacitor;

and supplying, with an auxiliary capacitor, electric energy to a subsequent circuit;

storing, with the auxiliary capacitor, electric energy released by the bus capacitor and the first inductor;

wherein the first working state comprises: the bus capacitor and the first inductor form a first current loop; and the second working state comprises: the auxiliary capacitor, the bus capacitor, and the first inductor form a second current loop; and in the second current loop, the bus capacitor and the first inductor are connected in series, and the rectifier current, the PFC circuit, the bus capacitor, and the auxiliary capacitor are sequentially connected.

17. The method according to claim 16, wherein the first inductor, the bus capacitor, and the auxiliary capacitor are connected through a switch circuit;

controlling the power conversion apparatus to be in the first working state further comprises:

controlling a first part of the switch circuit to be connected, wherein the first part of the switch circuit is configured to connect the bus capacitor and the first inductor; and controlling the power conversion apparatus to be in the second working state further comprises:

controlling a second part of the switch circuit to be connected, wherein the second part of the switch circuit is configured to connect the bus capacitor, the first inductor, and the auxiliary capacitor.

18. The method according to claim 17, wherein the switch circuit comprises a first switch unit, a second switch unit, a third switch unit, and a fourth switch unit; a first port of the first inductor is connected to a positive electrode of the bus capacitor through the first switch unit, the first port of the first inductor is connected to a negative electrode of the bus capacitor through the second switch unit, the positive electrode of the bus capacitor is connected to a positive electrode of the auxiliary capacitor, and a negative electrode of the auxiliary capacitor is connected to the first port of the first inductor through the second switch unit; the apparatus further comprises a third switch unit and a fourth switch unit; and a second port of the first inductor is connected to the negative electrode of the bus capacitor through the third switch unit, and the negative electrode of the auxiliary capacitor is connected to the negative electrode of the bus capacitor through the fourth switch unit;

controlling the power conversion apparatus to be in the first working state further comprises:

controlling the first switch unit and the third switch unit to be turned on; and controlling the second switch unit and the fourth switch unit to be turned off, so that the power conversion apparatus is in the first working state; and controlling the power conversion apparatus to be in the second working state further comprises:

controlling the second switch unit and the third switch unit to be turned on; and controlling the first switch unit and the fourth switch unit to be turned off, so that the power conversion apparatus is in the second working state.

19. The method according to claim 17, wherein the switch circuit comprises a first switch unit, a second switch unit, a third switch unit, and a fourth switch unit; a first port of the first inductor is connected to a positive electrode of the bus capacitor through the first switch unit, the first port of the first inductor is connected to a negative electrode of the bus capacitor through the second switch unit, a positive electrode of the auxiliary capacitor is connected to the first port of the first inductor through the first switch unit, and the negative electrode of the bus capacitor is connected to a negative electrode of the auxiliary capacitor; the apparatus comprises a third switch unit and a fourth switch unit; and a second port of the first inductor is connected to the positive electrode of the bus capacitor through the third switch unit, and the positive electrode of the auxiliary capacitor is connected to the positive electrode of the bus capacitor through the fourth switch unit;

controlling the power conversion apparatus to be in the first working state comprises:

controlling the second switch unit and the third switch unit to be turned on; and controlling the first switch unit and the fourth switch unit to be turned off, so that the power conversion apparatus is in the first working state; and controlling the power conversion apparatus to be in the second working state further comprises:

controlling the first switch unit and the third switch unit to be turned on; and controlling the second switch unit and the fourth switch unit to be turned off, so that the power conversion apparatus is in the second working state.

20. The apparatus according to claim 9, wherein the first switch unit further comprises a first field effect MOS transistor and a second MOS transistor, the first MOS transistor and the second MOS transistor are connected in series, and a drain of the first MOS transistor is connected to a drain of the second MOS transistor.

* * * * *